United States Patent
Kim

(10) Patent No.: US 8,745,490 B2
(45) Date of Patent: Jun. 3, 2014

(54) MOBILE TERMINAL CAPABLE OF CONTROLLING VARIOUS OPERATIONS USING A MULTI-FINGERPRINT-TOUCH INPUT AND METHOD OF CONTROLLING THE OPERATION OF THE MOBILE TERMINAL

(75) Inventor: Jong Hwan Kim, Seoul (KR)

(73) Assignee: LG Electronics Inc., Seoul (KR)

(*) Notice: Subject to any disclaimer, the term of this patent is extended or adjusted under 35 U.S.C. 154(b) by 364 days.

(21) Appl. No.: 12/716,935

(22) Filed: Mar. 3, 2010

(65) Prior Publication Data

US 2010/0225607 A1  Sep. 9, 2010

(30) Foreign Application Priority Data

Mar. 6, 2009 (KR) .................. 10-2009-0019361

(51) Int. Cl.
*G06F 3/01* (2006.01)
(52) U.S. Cl.
USPC ........................ 715/702; 345/173; 382/124
(58) Field of Classification Search
USPC .................... 345/173; 715/700–866
See application file for complete search history.

(56) References Cited

U.S. PATENT DOCUMENTS

| 5,420,936 | A  | * | 5/1995 | Fitzpatrick et al. | 382/124 |
| 6,466,198 | B1 | * | 10/2002 | Feinstein | 345/158 |
| 2002/0126881 | A1 | * | 9/2002 | Langley | 382/124 |
| 2003/0014252 | A1 | * | 1/2003 | Shizuka et al. | 704/258 |
| 2003/0128227 | A1 | * | 7/2003 | Crow et al. | 345/700 |
| 2005/0264840 | A1 | * | 12/2005 | Niitsuma | 358/1.14 |
| 2006/0026521 | A1 | * | 2/2006 | Hotelling et al. | 715/702 |
| 2006/0075256 | A1 |   | 4/2006 | Hagiwara et al. | |
| 2008/0001703 | A1 | * | 1/2008 | Goto | 340/5.8 |
| 2009/0280860 | A1 | * | 11/2009 | Dahlke | 455/556.1 |

FOREIGN PATENT DOCUMENTS

| EP | 0593386 | 4/1994 |
| EP | 1239403 | 9/2002 |
| EP | 1480157 | 11/2004 |
| WO | 2007133483 | 11/2007 |

OTHER PUBLICATIONS

European Patent Office Application Serial No. 10001899.3, Office Action dated Feb. 7, 2014, 8 pages.

* cited by examiner

*Primary Examiner* — Alexander S Beck
*Assistant Examiner* — Charles Zheng
(74) *Attorney, Agent, or Firm* — Lee, Hong, Degerman, Kang & Waimey

(57) ABSTRACT

A mobile terminal and a method of controlling the mobile terminal are provided. The method includes displaying an operation screen on a display module capable of identifying a fingerprint; if a multi-fingerprint-touch input including first and second fingerprint-touch inputs is received through the display module, selecting a locked operation menu from the operation screen; and if fingerprint information of the multi-fingerprint-touch input is authenticated, unlocking and then executing the selected operation menu. Therefore, it is possible to perform fingerprint authentication and the execution of an operation at the same time in response to a multi-fingerprint-touch input.

15 Claims, 19 Drawing Sheets

(a)

(b)

(a)

(b)

(a)

(b)

(c)

(a)　　　　　　　　　　　　　　　(b)

MOBILE TERMINAL CAPABLE OF CONTROLLING VARIOUS OPERATIONS USING A MULTI-FINGERPRINT-TOUCH INPUT AND METHOD OF CONTROLLING THE OPERATION OF THE MOBILE TERMINAL

CROSS-REFERENCE TO RELATED APPLICATION

Pursuant to 35 U.S.C. 119(a), this application claims the benefit of earlier filing date and right of priority to Korean Patent Application No. 10-2009-0019361, filed on Mar. 6, 2009, the contents of which are hereby incorporated by reference herein in its entirety.

BACKGROUND OF THE INVENTION

1. Field of the Invention

The present invention relates to a mobile terminal and a method of controlling the mobile terminal, and more particularly, to a mobile terminal and a method of controlling the mobile terminal, in which various operations performed by the mobile terminal can be effectively controlled in response to a multi-fingerprint-touch input.

2. Description of the Related Art

Mobile terminals are portable devices, which can provide users with various services such as a voice calling service, a video calling service, an information input/output service, and a data storage service.

As the types of services provided by mobile terminals diversify, an increasing number of mobile terminals have been equipped with various complicated functions such as capturing photos or moving pictures, playing music files or moving image files, providing game programs, receiving broadcast programs and providing wireless Internet services and have thus evolved into multimedia players.

Various attempts have been made to realize such complicated functions as hardware devices or software programs. For example, various user interface (UI) environments, in which users are allowed to easily search for and choose desired functions, have been developed. In addition, the demand for various designs for mobile terminals such as a double-sided liquid crystal display (LCD) or a full touch screen has steadily grown due to a growing tendency of considering mobile terminals as personal items that can represent personal individuality.

However, there is a restriction in allocating sufficient space for a UI for an efficient use of various functions provided by a mobile terminal without compromising the mobility and the portability of the mobile terminal. Therefore, it is necessary to develop ways to control the operation of a mobile terminal using a new data input method, other than an existing menu-based method, and thus efficiently use various functions provided by the mobile terminal.

SUMMARY OF THE INVENTION

The present invention provides a mobile terminal and a method of controlling the mobile terminal, in which various operations performed by the mobile terminal can be effectively controlled in response to a multi-fingerprint-touch input.

According to an aspect of the present invention, there is provided a method of controlling a mobile terminal, the method including a displaying an operation screen on a display module capable of identifying a fingerprint; if a multi-fingerprint-touch input including first and second fingerprint-touch inputs is received through the display module, selecting a locked operation menu from the operation screen; and if fingerprint information of the multi-fingerprint-touch input is authenticated, unlocking and then executing the selected operation menu According to another aspect of the present invention, there is provided a mobile terminal including a display module configured to be capable of identifying a fingerprint and to display an operation screen; and a controller configured to receive a multi-fingerprint-touch input including first and second fingerprint-touch inputs through the display module and select a locked operation menu from the operation screen, wherein, if fingerprint information of the multi-fingerprint-touch input is authenticated, the controller unlocks and then executes the selected operation menu.

According to another aspect of the present invention, there is provided a method of controlling a mobile terminal, the method including displaying an operation screen on a display module capable of identifying a fingerprint; if a fingerprint-touch input is received through the display module, selecting a locked operation menu from the operation screen; and if fingerprint information of the fingerprint-touch input matches with previously-stored fingerprint information for unlocking the selected operation menu, unlocking and then executing the selected operation menu.

According to another aspect of the present invention, there is provided a mobile terminal including a display module configured to be capable of identifying a fingerprint and to display an operation screen; a memory configured to store a plurality of pieces of fingerprint information on at least one of a finger-by-finger basis, on a user-by-user basis, and a pattern-by-pattern basis; and a controller configured to receive a fingerprint-touch input through the display module and select a locked operation menu from the operation screen, wherein, if fingerprint information of the fingerprint-touch input matches with the stored fingerprint information for unlocking the selected operation menu, the controller unlocks and then executes the selected operation menu.

According to another aspect of the present invention, there is provided a method of controlling a mobile terminal, the method including displaying an operation screen on a display module capable of identifying a fingerprint; if a first fingerprint-touch input is received through the display module and first fingerprint information of the first fingerprint-touch input is authenticated, selecting an item corresponding to the first fingerprint-touch input from the operation screen; and if a first fingerprint-touch input is received through the display module and second fingerprint information of the second fingerprint-touch input is authenticated, performing a predefined operation on the selected item.

According to another aspect of the present invention, there is provided a mobile terminal including a display module configured to be capable of identifying a fingerprint and to display an operation screen; and a controller configured to receive a first fingerprint-touch input through the display module and to select an item corresponding to the first fingerprint-touch input from the operation screen if first fingerprint information of the first fingerprint-touch input is authenticated, wherein, if a first fingerprint-touch input is received through the display module and second fingerprint information of the second fingerprint-touch input is authenticated, the controller performs a predefined operation on the selected item.

BRIEF DESCRIPTION OF THE DRAWINGS

The above and other features and advantages of the present invention will become more apparent by describing in detail preferred embodiments thereof with reference to the attached drawings in which.

DETAILED DESCRIPTION OF THE INVENTION

The present invention will hereinafter be described in detail with reference to the accompanying drawings in which exemplary embodiments of the invention are shown.

The term 'mobile terminal', as used herein, may indicate a mobile phone, a smart phone, a laptop computer, a digital broadcast receiver, a personal digital assistant (PDA), a portable multimedia player (PMP), or a navigation device. In this disclosure, the terms 'module' and 'unit' can be used interchangeably.

Figure 1:
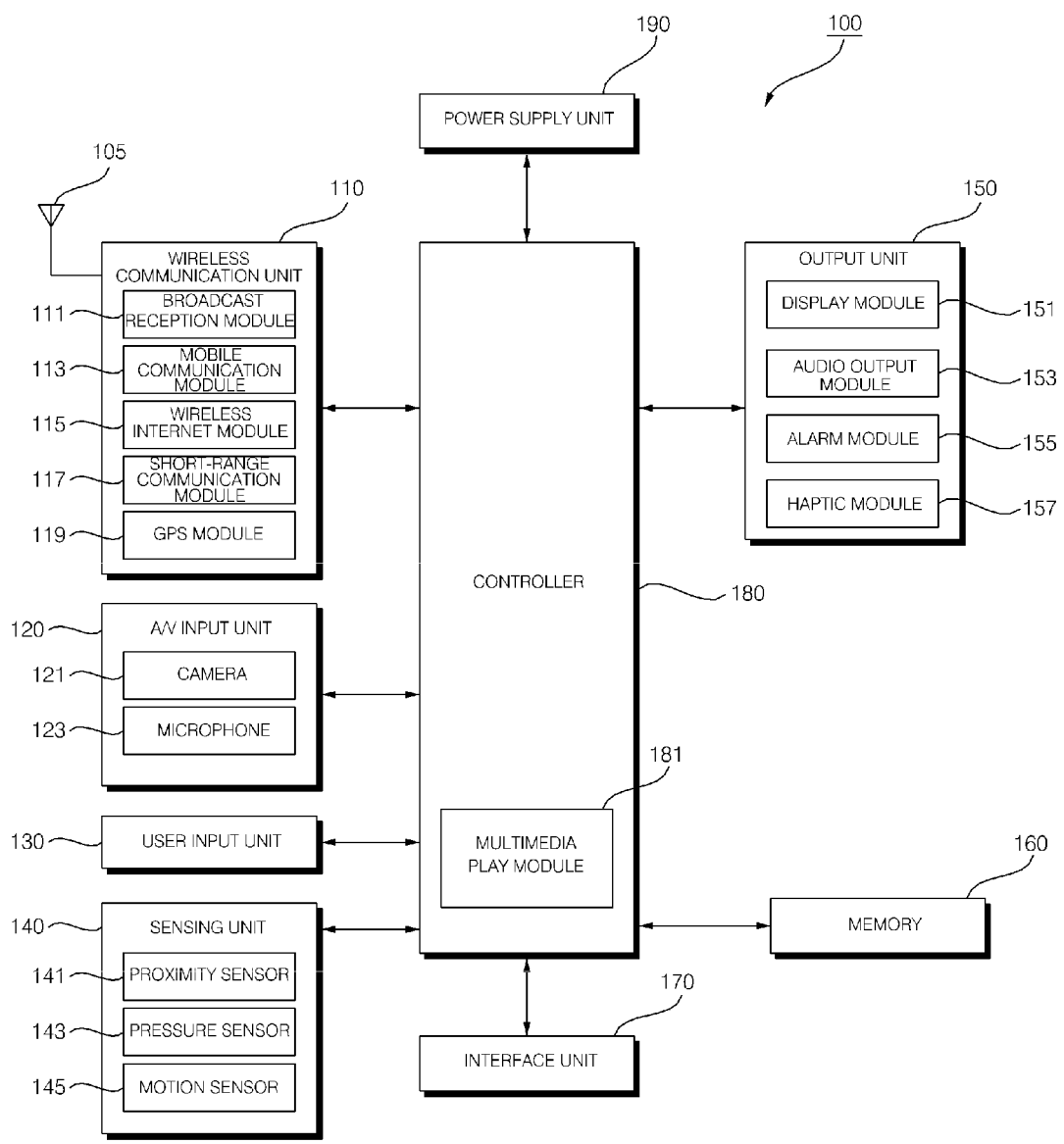
FIG. 1 illustrates a block diagram of a mobile terminal according to an exemplary embodiment of the present invention.

FIG. 1 illustrates a block diagram of a mobile terminal 100 according to an embodiment of the present invention. Referring to FIG. 1, the mobile terminal 100 may include a wireless communication unit 110, an audio/video (A/V) input unit 120, a user input unit 130, a sensing unit 140, an output unit 150, a memory 160, an interface unit 170, a controller 180, and a power supply unit 190. Two or more of the wireless communication unit 110, the A/V input unit 120, the user input unit 130, the sensing unit 140, the output unit 150, the memory 160, the interface unit 170, the controller 180, and the power supply unit 190 may be incorporated into a single unit, or some of the wireless communication unit 110, the A/V input unit 120, the user input unit 130, the sensing unit 140, the output unit 150, the memory 160, the interface unit 170, the controller 180, and the power supply unit 190 may be divided into two or more smaller units.

The wireless communication unit 110 may include a broadcast reception module 111, a mobile communication module 113, a wireless Internet module 115, a short-range communication module 117, and a global positioning system (GPS) module 119.

The broadcast reception module 111 may receive a broadcast signal and/or broadcast-related information from an external broadcast management server through a broadcast channel. The broadcast channel may be a satellite channel or a terrestrial channel. The broadcast management server may be a server which generates broadcast signals and/or broadcast-related information and transmits the generated broadcast signals and/or the generated broadcast-related information or may be a server which receives and then transmits previously-generated broadcast signals and/or previously-generated broadcast-related information.

The broadcast-related information may include broadcast channel information, broadcast program information and/or broadcast service provider information. The broadcast signal may be a TV broadcast signal, a radio broadcast signal, a data broadcast signal, the combination of a data broadcast signal and a TV broadcast signal or the combination of a data broadcast signal and a radio broadcast signal. The broadcast-related information may be provided to the mobile terminal 100 through a mobile communication network. In this case, the broadcast-related information may be received by the mobile communication module 113, rather than by the broadcast reception module 111. The broadcast-related information may come in various forms. For example, the broadcast-related information may be electronic program guide (EPG) of digital multimedia broadcasting (DMB) or may be electronic service guide (ESG) of digital video broadcast-handheld (DVB-H).

The broadcast reception module 111 may receive the broadcast signal using various broadcasting systems such as digital multimedia broadcasting-terrestrial (DMB-T), digital multimedia broadcasting-satellite (DMB-S), media forward link only (MediaFLO), DVB-H, and integrated services digital broadcast-terrestrial (ISDB-T). In addition, the broadcast reception module 111 may be configured to be suitable for nearly all types of broadcasting systems other than those set forth herein. The broadcast signal and/or the broadcast-related information received by the broadcast reception module 111 may be stored in the memory 160.

The mobile communication module 113 may transmit wireless signals to or receives wireless signals from at least one of a base station, an external terminal, and a server through a mobile communication network. The wireless signals may include various types of data according to whether the mobile terminal 100 transmits/receives voice call signals, video call signals, or text/multimedia messages.

The wireless Internet module 115 may be a module for wirelessly accessing the Internet. The wireless Internet module 115 may be embedded in the mobile terminal 100 or may be installed in an external device. The wireless Internet module 115 may be embedded in the mobile terminal 100 or may be installed in an external device. The wireless Internet module 115 may use various wireless Internet technologies such as wireless local area network (WLAN), Wireless Broadband (WiBro), World Interoperability for Microwave Access (Wimax), and High Speed Downlink Packet Access (HSDPA).

The short-range communication module 117 may be a module for short-range communication. The short-range communication module 117 may use various short-range communication techniques such as Bluetooth™, radio frequency identification (RFID), infrared data association (IrDA), ultra wideband (UWB), and ZigBee™.

The GPS module 119 may receive position information from a plurality of GPS satellites.

The A/V input unit 120 may be used to receive audio signals or video signals. The A/V input unit 120 may include a camera 121 and a microphone 123. The camera 121 may process various image frames such as still images or moving images captured by an image sensor during a video call mode or an image capturing mode. The image frames processed by the camera 121 may be displayed by a display module 151.

The image frames processed by the camera 121 may be stored in the memory 160 or may be transmitted to an external device through the wireless communication unit 110. The mobile terminal 100 may include two or more cameras 121.

The microphone 123 may receive external sound signals during a call mode, a recording mode, or a voice recognition mode with the use of a microphone and may convert the sound signals into electrical sound data. In the call mode, the mobile communication module 113 may convert the electrical sound data into data that can be readily transmitted to a mobile communication base station and then output the data obtained by the conversion. The microphone 123 may use various noise removal algorithms to remove noise that may be generated during the reception of external sound signals.

The user input unit 130 may generate key input data based on user input for controlling the operation of the mobile terminal 100. The user input unit 130 may be implemented as a keypad, a dome switch, a touch pad (static pressure/static voltage), a jog wheel, or a jog switch. In particular, if the user input unit 130 is implemented as a touch pad and forms a layer structure together with the display module 151, the user input unit 130 and the display module 151 may be collectively referred to as a touch screen.

The sensing unit 140 determines a current state of the mobile terminal 100 such as whether the mobile terminal 100 is opened up or closed, the position of the mobile terminal 100 and whether the mobile terminal 100 is placed in contact with a user, and generates a sensing signal for controlling the operation of the mobile terminal 100. For example, when the mobile terminal 100 is a slider-type mobile phone, the sensing unit 140 may determine whether the mobile terminal 100 is opened up or closed. In addition, the sensing unit 140 may determine whether the mobile terminal 100 is powered by the power supply unit 190 and whether the interface unit 170 is connected to an external device.

The sensing unit 140 may include a proximity sensor 141, a pressure sensor 143 and a motion sensor 145. The proximity sensor 141 may determine whether there is an object nearby and approaching the mobile terminal 100 without any mechanical contact with the entity. More specifically, the proximity sensor 141 may detect an object that is nearby and approaching by detecting a change in an alternating magnetic field or the rate of change of static capacitance. The sensing unit 140 may include two or more proximity sensors 141.

The pressure sensor 143 may determine whether pressure is being applied to the mobile terminal 100 or may measure the level of pressure, if any, applied to the mobile terminal 100. The pressure sensor 143 may be installed in a certain part of the mobile terminal 100 where the detection of pressure is necessary. For example, the pressure sensor 143 may be installed in the display module 151. In this case, it is possible to differentiate a typical touch input from a pressure touch input, which is generated using a higher pressure level than that used to generate a typical touch input, based on data provided by the pressure sensor 143. In addition, when a pressure touch input is received through the display module 151, it is possible to determine the level of pressure applied to the display module 151 upon the detection of a pressure touch input based on data provided by the pressure sensor 143.

The motion sensor 145 may determine the location and motion of the mobile terminal 100 using an acceleration sensor or a gyro sensor.

In the meantime, acceleration sensors are a type of device for converting a vibration in acceleration into an electric signal. With recent developments in micro-electromechanical system (MEMS) technology, acceleration sensors have been widely used in various products for various purposes ranging from detecting large motions such as car collisions as performed in airbag systems for automobiles to detecting minute motions such as the motion of the hand as performed in gaming input devices. In general, one or more acceleration sensors representing two or three axial directions are incorporated into a single package. There are some cases when the detection of only one axial direction, for example, a Z-axis direction, is necessary. Thus, when an X- or Y-axis acceleration sensor, instead of a Z-axis acceleration sensor, is required, the X- or Y-axis acceleration sensor may be mounted on an additional substrate, and the additional substrate may be mounted on a main substrate.

Gyro sensors are sensors for measuring angular velocity, and may determine the relative direction of the rotation of the mobile terminal 100 to a reference direction.

The output unit 150 may output audio signals, video signals and alarm signals. The output unit 150 may include the display module 151, an audio output module 153, an alarm module 155, and a haptic module 157.

The display module 151 may display various information processed by the mobile terminal 100. For example, if the mobile terminal 100 is in a call mode, the display module 151 may display a user interface (UI) or a graphic user interface (GUI) for making or receiving a call. If the mobile terminal 100 is in a video call mode or an image capturing mode, the display module 151 may display a UI or a GUI for capturing or receiving images.

If the display module 151 and the user input unit 130 form a layer structure together and are thus implemented as a touch screen, the display module 151 may be used as both an output device and an input device. If the display module 151 is implemented as a touch screen, the display module 151 may also include a touch screen panel and a touch screen panel controller. The touch screen panel is a transparent panel attached onto the exterior of the mobile terminal 100 and may be connected to an internal bus of the mobile terminal 100. The touch screen panel keeps monitoring whether the touch screen panel is being touched by the user. Once a touch input to the touch screen panel is received, the touch screen panel transmits a number of signals corresponding to the touch input to the touch screen panel controller. The touch screen panel controller processes the signals transmitted by the touch screen panel, and transmits the processed signals to the controller 180. Then, the controller 180 determines whether a touch input has been generated and which part of the touch screen panel has been touched based on the processed signals transmitted by the touch screen panel controller.

The display module 151 may include electronic paper (e-paper). E-paper is a type of reflective display technology and can provide as high resolution as ordinary ink on paper, wide viewing angles, and excellent visual properties. E-paper can be implemented on various types of substrates such as a plastic, metallic or paper substrate and can display and maintain an image thereon even after power is cut off. In addition, e-paper can reduce the power consumption of the mobile terminal 100 because it does not require a backlight assembly. The display module 151 may be implemented as e-paper by using electrostatic-charged hemispherical twist balls, using electrophoretic deposition, or using microcapsules.

The display module 151 may include at least one of a liquid crystal display (LCD), a thin film transistor (TFT)-LCD, an organic light-emitting diode (OLED), a flexible display, and a three-dimensional (3D) display. The mobile terminal 100 may include two or more display modules 151. For example, the mobile terminal 100 may include an external display module (not shown) and an internal display module (not shown).

The audio output module 153 may output audio data received by the wireless communication unit 110 during a call reception mode, a call mode, a recording mode, a voice recognition mode, or a broadcast reception mode or may output audio data present in the memory 160. In addition, the audio output module 153 may output various sound signals associated with the functions of the mobile terminal 100 such as receiving a call or a message. The audio output module 153 may include a speaker and a buzzer.

The alarm module 155 may output an alarm signal indicating the occurrence of an event in the mobile terminal 100. Examples of the event include receiving a call signal, receiving a message, and receiving a key signal. Examples of the alarm signal output by the alarm module 155 include an audio signal, a video signal and a vibration signal. More specifically, the alarm module 155 may output an alarm signal upon receiving a call signal or a message. In addition, the alarm module 155 may receive a key signal and may output an alarm signal as feedback to the key signal. Therefore, the user may be able to easily recognize the occurrence of an event based on an alarm signal output by the alarm module 155. An alarm signal for notifying the user of the occurrence of an event may be output not only by the alarm module 155 but also by the display module 151 or the audio output module 153.

The haptic module 157 may provide various haptic effects (such as vibration) that can be perceived by the user. If the haptic module 157 generates vibration as a haptic effect, the intensity and the pattern of vibration generated by the haptic module 157 may be altered in various manners. The haptic module 157 may synthesize different vibration effects and may output the result of the synthesization. Alternatively, the haptic module 157 may sequentially output different vibration effects.

The haptic module 157 may provide various haptic effects, other than vibration, such as a haptic effect obtained using a pin array that moves perpendicularly to a contact skin surface, a haptic effect obtained by injecting or sucking in air through an injection hole or a suction hole, a haptic effect obtained by giving a stimulus to the surface of the skin, a haptic effect obtained through contact with an electrode, a haptic effect obtained using an electrostatic force, and a haptic effect obtained by realizing the sense of heat or cold using a device capable of absorbing heat or generating heat. The haptic module 157 may be configured to enable the user to recognize a haptic effect using the kinesthetic sense of the fingers or the arms. The mobile terminal 100 may include two or more haptic modules 157.

The memory 160 may store various programs necessary for the operation of the controller 180. In addition, the memory 160 may temporarily store various data such as a phonebook, messages, still images, or moving images.

The memory 160 may include at least one of a flash memory type storage medium, a hard disk type storage medium, a multimedia card micro type storage medium, a card type memory (e.g., a secure digital (SD) or extreme digital (XD) memory), a random access memory (RAM), and a read-only memory (ROM). The mobile terminal 100 may operate a web storage, which performs the functions of the memory 160 on the Internet.

The interface unit 170 may interface with an external device that can be connected to the mobile terminal 100. The interface unit 170 may be a wired/wireless headset, an external battery charger, a wired/wireless data port, a card socket for, for example, a memory card, a subscriber identification module (SIM) card or a user identity module (UIM) card, an audio input/output (I/O) terminal, a video I/O terminal, or an earphone. The interface unit 170 may receive data from an external device or may be powered by an external device. The interface unit 170 may transmit data provided by an external device to other components in the mobile terminal 100 or may transmit data provided by other components in the mobile terminal 100 to an external device.

When the mobile terminal 100 is connected to an external cradle, the interface unit 170 may provide a path for supplying power from the external cradle to the mobile terminal 100 or for transmitting various signals from the external cradle to the mobile terminal 100.

The controller 180 may control the general operation of the mobile terminal 100. For example, the controller 180 may perform various control operations regarding making/receiving a voice call, transmitting/receiving data, or making/receiving a video call. The controller 180 may include a multimedia play module 181, which plays multimedia data. The multimedia play module 181 may be implemented as a hardware device and may be installed in the controller 180. Alternatively, the multimedia play module 181 may be implemented as a software program.

The power supply unit 190 may be supplied with power by an external power source or an internal power source and may supply power to the other components in the mobile terminal 100.

The mobile terminal 100 may include a wired/wireless communication system or a satellite communication system and may thus be able to operate in a communication system capable of transmitting data in units of frames or packets.

The exterior of the mobile terminal 100 will hereinafter be described in detail with reference to FIGS. 2 and 3. For convenience, assume that the mobile terminal 100 is a slider-type mobile terminal equipped with a touch screen. However, the present invention is not restricted to a slider-type mobile terminal. Rather, the present invention can be applied to various mobile phones, other than a slider-type mobile terminal.

Figure 2:
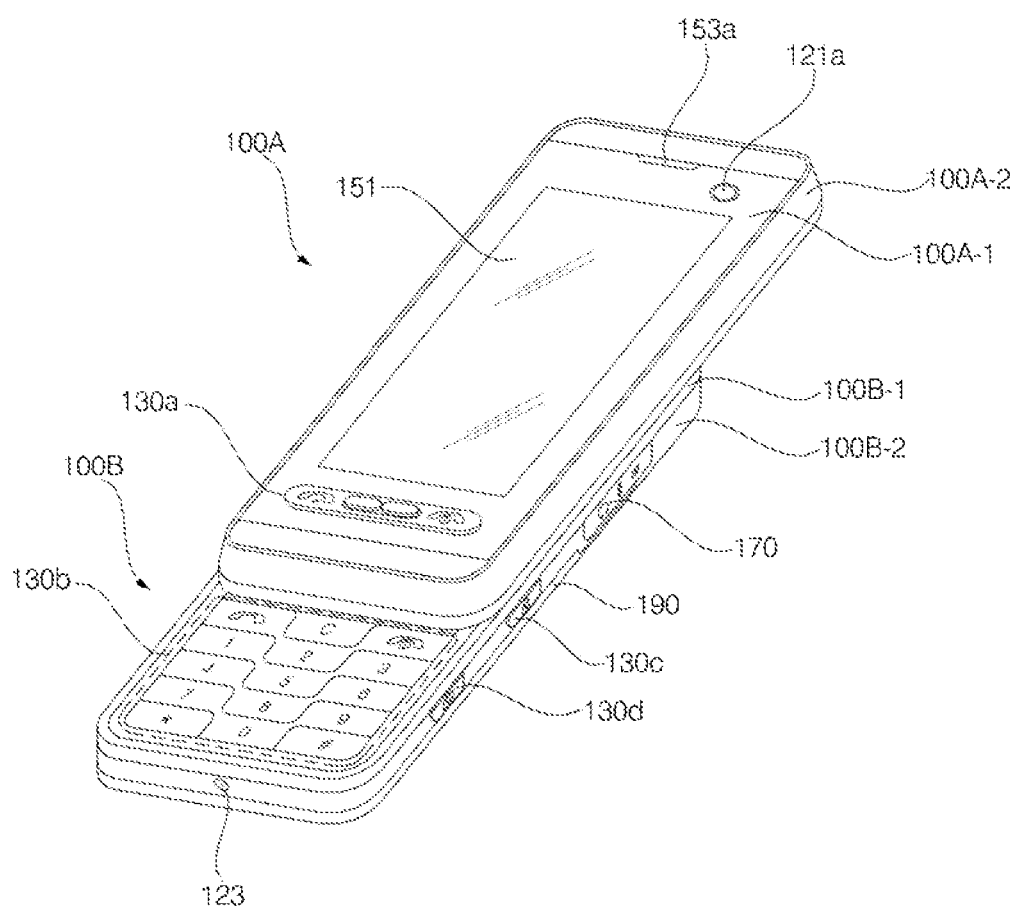
FIG. 2 illustrates a front perspective view of the mobile terminal shown in FIG. 1.

FIG. 2 illustrates a front perspective view of the mobile terminal 100 shown in FIG. 1. Referring to FIG. 2, the mobile terminal 100 may include a first body 100A and a second body 100B which can slide up or down against the first body 100A.

When the first body 100A and the second body 100B completely overlap each other, the mobile terminal 100 is referred to as being closed. On the other hand, when the first body 100A is slid up against the second body 100B and thus the front of the second body 100B is partially exposed, as shown in FIG. 2, the mobile terminal 100 is referred to as being open.

When the mobile terminal 100 is closed, the mobile terminal may generally operate in a standby mode and may be released from the standby mode in response to user manipulation. On the other hand, when the mobile terminal 100 is open, the mobile terminal 100 may generally operate in a call mode and may be switched to the standby mode either manually in response to user manipulation or automatically after the lapse of a predefined amount of time.

Referring to FIG. 2, the exterior of the first body 100A may be defined by a first front case 100A-1 and a first rear case 100A-2. Various electronic devices may be installed in the space formed by the first front case 100A-1 and the first rear case 100A-2. At least one intermediate case may be additionally provided between the first front case 100A-1 and the first rear case 100A-2. The first front case 100A-1 and the first rear case 100A-2 may be formed of a synthetic resin through injection molding. Alternatively, the first front case 100A-1 and the first rear case 100A-2 may be formed of a metal such as stainless steel (STS) or titanium (Ti).

The display module 151, a first audio output module 153a, a first camera 121a and a first user input unit 130a may be disposed in the front case 100A-1.

Examples of the display module 151 include an LCD and an OLED which can visualize information. Since a touch pad is configured to overlap the display module 151 and thus to form a layer structure, the display module 151 may serve as a touch screen. Thus, it is possible for the user to input various information to the mobile terminal 100 simply by touching the display module 151.

The exterior of the second body 100B may be defined by a second front case 100B-1 and a second rear case 100B-2. A second user input unit 130b may be disposed in the second body 100B, and particularly, at the front of the second front case 100B-1. Third and fourth user input units 130c and 130d, the microphone 123 and the interface unit 170 may be provided in the second front case 100B-1 or the second rear case 100B-2.

The first through fourth user input units 130a through 130d and fifth and sixth user input units 130e and 130f may be collectively referred to as the user input unit 130. The user input unit 130 may adopt various manipulation methods as long as it can offer tactile feedback to the user.

The first user input unit 130a may allow the user to input various commands such as 'start', 'end', and 'scroll' to the mobile terminal 100, the second user input unit 130b may be used to input various numerals, characters or symbols, and the third and fourth user input units 130c and 130d may be used as hot keys for activating certain functions of the mobile terminal 100.

The microphone 123 may be configured to properly receive the user's voice or other sounds.

Figure 3:
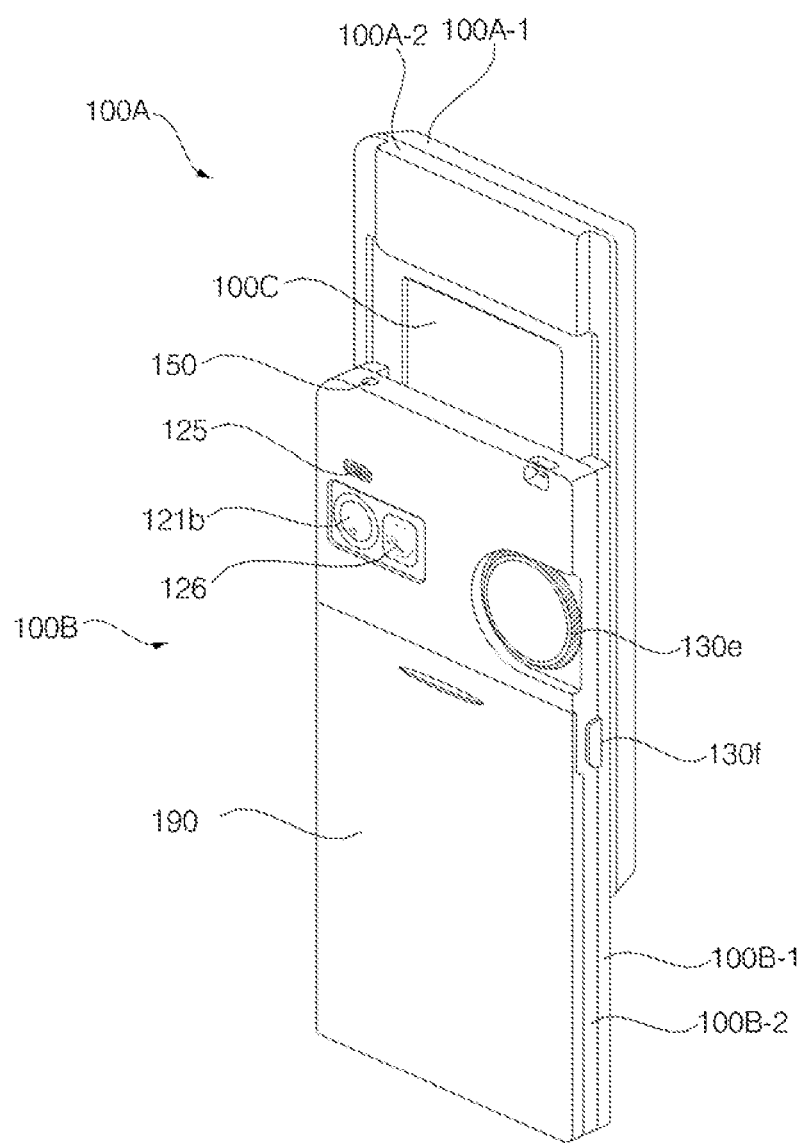
FIG. 3 illustrates a rear perspective view of the mobile terminal shown in FIG. 1.
Figure 4:
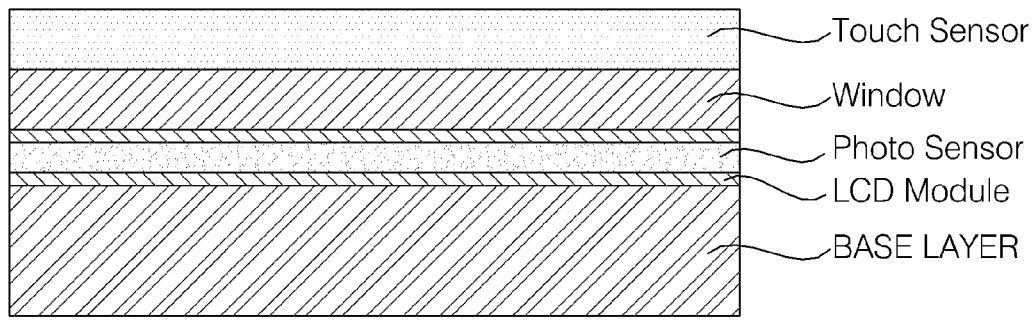
FIGS. 4 through 8 illustrate the structure of a display module capable of identifying a fingerprint, which can be used in the mobile terminal shown in FIG. 1.
Figure 4:
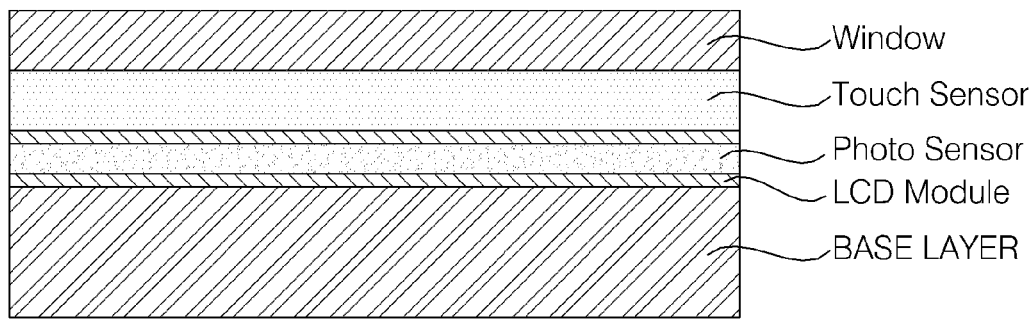

FIG. 3 illustrates a rear perspective view of the mobile terminal 100 shown in FIG. 2. Referring to FIG. 3, the fifth user input unit 130e, which is of a wheel type, and the second camera 121b may be disposed at the rear of the second rear case 100B-2 of the second body 100B, and a sixth user input unit 130f may be disposed on one side of the second body 100B.

The second camera 121b may have a different photographing direction from that of the first camera 121a shown in FIG. 2. In addition, the first and second cameras 121a and 121b may have different resolutions. For example, the first camera 121a may be used to capture and then transmit an image of the face of the user during a video call. Thus, a low-resolution camera may be used as the first camera 121a. The second camera 121b may be used to capture an image of an ordinary subject. In this case, the image captured by the second camera 121b may not need to be transmitted. Thus, a high-resolution camera may be used as the second camera 121b.

A camera flash 125 and a mirror 126 may be disposed near the second camera 121b. The camera flash 125 may be used to illuminate a subject when the user attempts to capture an image of the subject with the second camera 121b. The mirror 126 may be used for the user to prepare him- or herself for taking a self shot.

A second audio output module (not shown) may be additionally provided in the second rear case 100B-2. The second audio output module may realize a stereo function along with the first audio output module 153a. The second audio output module may also be used in a speaker-phone mode.

An antenna (not shown) for receiving a broadcast signal may be disposed on one side of the second rear case 100B-2. The antenna may be installed so as to be able to be pulled out of the second rear case 100B-2.

A slide module 100C may be partially exposed on the first rear case 100A-2 of the first body 100A. The slide module 100C may couple the first body 100A and the second body 100B such that the first body 100A and the second body 100B can slide up and down against each other. A portion of the slide module 100C may be hidden from view by the second front case 100B-1 of the second body 100B, and thus may not be exposed.

The second camera 121b and the other elements that have been described as being provided on the rear case 100A-2 may be provided on the front case 100A-1. In addition, the first camera 121a may be configured to be rotatable and thus to cover the photographing direction of the second camera 121b. In this case, the second camera 121b may be optional.

The power supply unit 190 may be disposed in the rear case 100A-2. The power supply unit may be a rechargeable battery and may be coupled to the rear case 100A-2 so as to be attachable to or detachable from the rear case 100A-2.

FIGS. 4 through 8 illustrate the structure of the display module 151, which is capable of identifying a fingerprint. A touch input made by placing a pointer such as a pen in contact with the surface of the display module 151 will hereinafter be referred to as an ordinary touch input, and a touch input made by placing the user's finger in contact with the surface of the display module 151 so as to provide fingerprint information will hereinafter be referred to as a fingerprint-touch input.

In order to generate a fingerprint-touch input, the display module 151 may need to be configured to be able to identify a fingerprint. For this, the display module 151 may include an LCD module with a photo sensor embedded therein or an LCD module covered with a scan film with a photo sensor.

Referring to FIGS. 4(a) and 4(b), the display module 151 may include an LCD module having a photo sensor embedded therein. A touch sensor may be disposed on the top or bottom of a window. More specifically, the display module 151 may include a stack of a base layer, an LCD module, a photo sensor, a window, and a touch sensor, as shown in FIG. 4(a), or may include a stack of the base layer, the LCD module, the photo sensor, the touch sensor and the window, as shown in FIG. 4(b).

The display module 151 may also be configured, without using the touch sensor, to be able to identify a fingerprint by using a scan structure of the photo sensor. In this case, the display module 151 may include a stack of the base layer, the LCD module, the photo sensor and the window.

Figure 5:
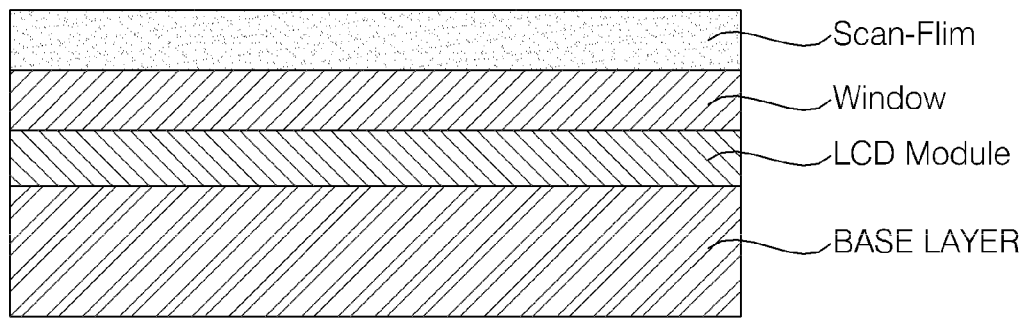
Figure 5:
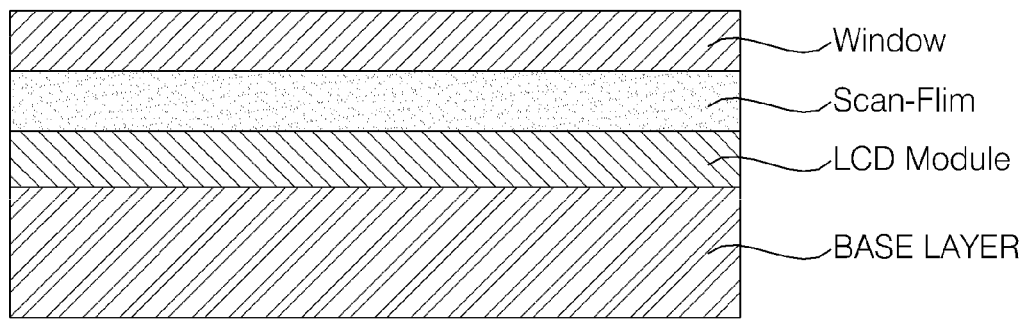
Figure 6:
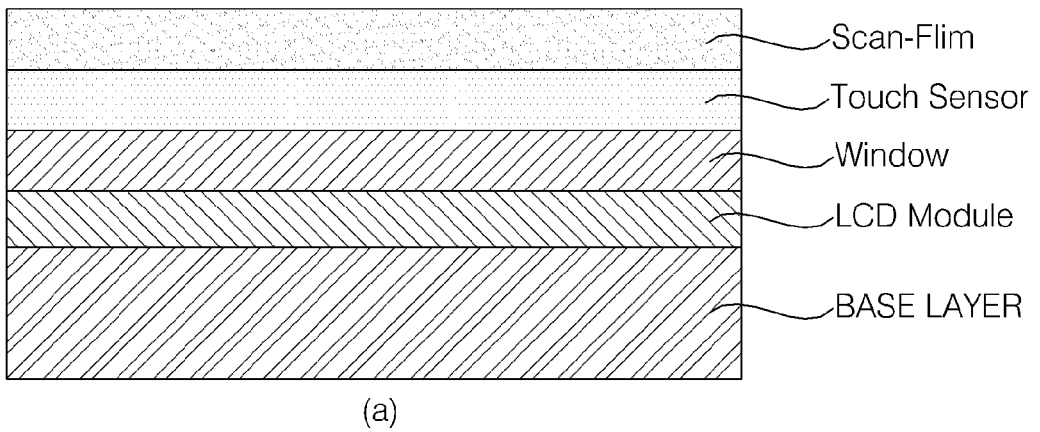
Figure 6:
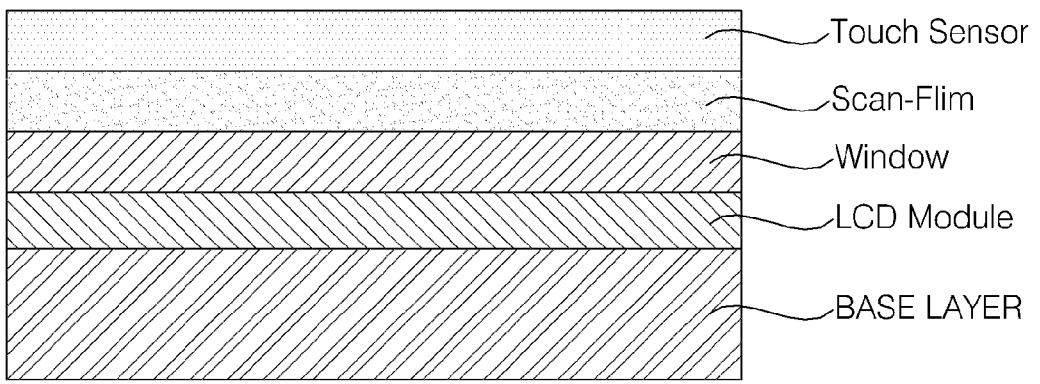
Figure 6:
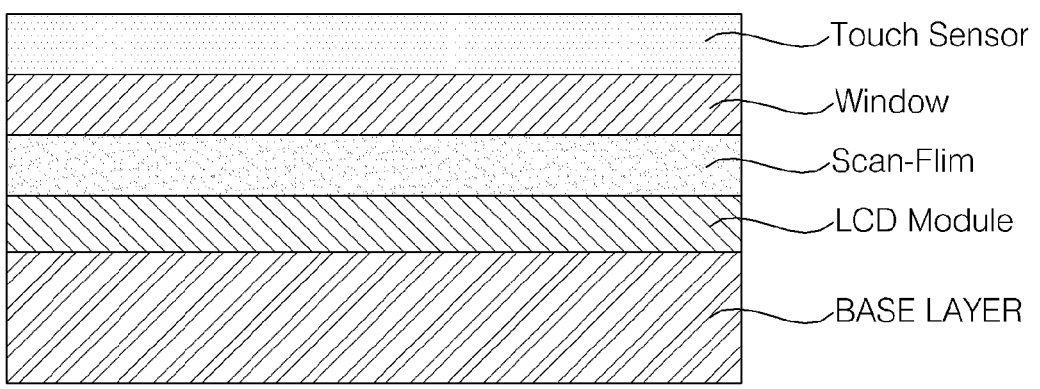

Alternatively, referring to FIGS. 5(a) through 6(c), the display module 151 may include an LCD module covered with a scan film having a photo sensor. More specifically, the display module 151 may include a stack of a base layer, an LCD module, a window and a transparent scan film, as shown in FIG. 5(a), or may include a stack of the base layer, the LCD module, the transparent scan film and the window, as shown in FIG. 5(b).

Referring to FIGS. 6(a) through 6(c), the display module 151 may include both a scan film and a touch sensor. More specifically, the display module 151 may include a stack of a base layer, an LCD module, a window, the touch sensor and the scan film, as shown in FIG. 6(a), may include a stack of the base layer, the LCD module, the window, the scan film and the touch sensor, as shown in FIG. 6(b), or may include a stack of the base layer, the LCD module, the scan film, the window, and the touch sensor, as shown in FIG. 6(c).

The touch sensor may be disposed at the top or bottom of the window. Thus, the display module 151 may have a structure in which the base layer, the LCD module, the touch sensor, the window and the scan film are sequentially deposited, a structure in which the base layer, the LCD module, the touch sensor, the photo sensor and the window are sequentially deposited, or a structure in which the base layer, the LCD module, the photo sensor, the touch sensor and the window are sequentially deposited.

Figures 7, 8:
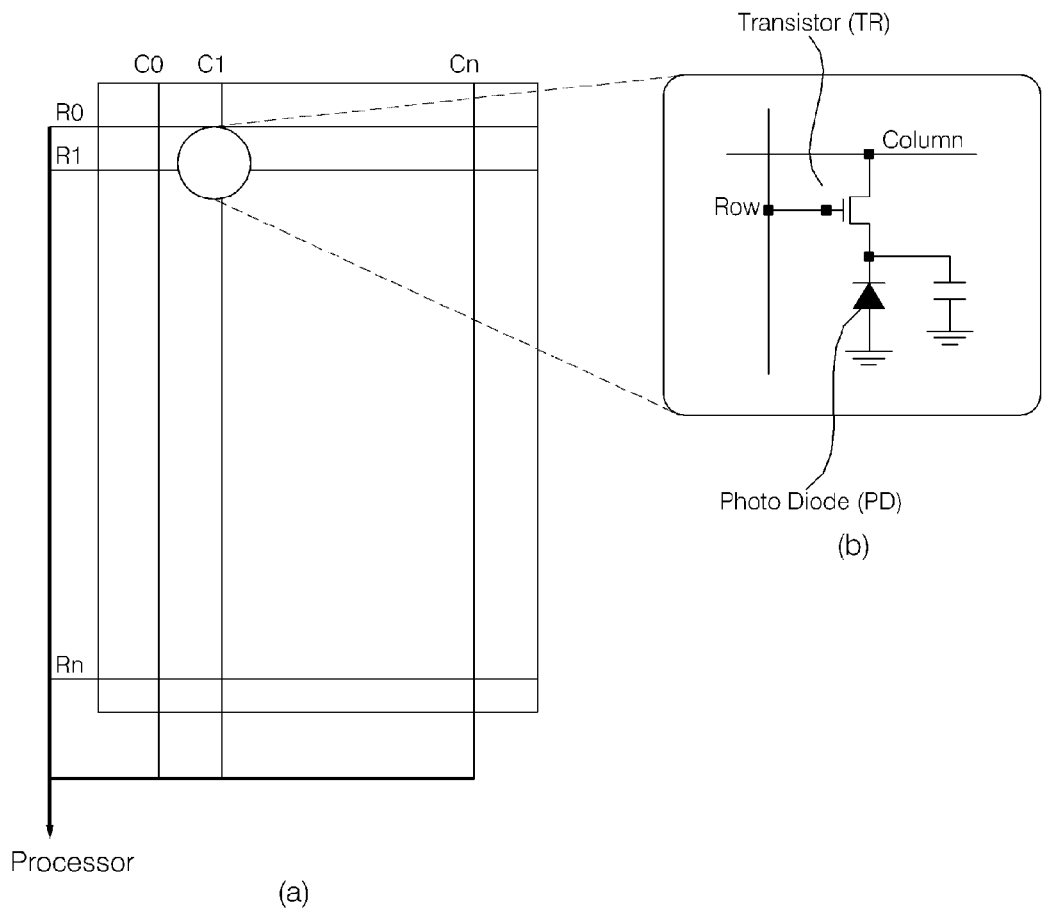

Referring to FIG. 7, a scan film may include a transparent film, which is formed of a transparent material such as glass, and a plurality of photodiodes PD and a plurality of transistors TR, which are mounted on the transparent film and are disposed at the intersections of a plurality of rows $R_0$ through $R_n$ and a plurality of columns $C_0$ through $C_n$ on the transparent film. Thus, the scan film may be able to scan any object placed thereon by using an electric signal whose level varies according to the amount of light applied to the photodiodes.

It is possible to perform a black-and-white scan operation including fingerprint identification by using a basic scan function of the scan film. In addition, it is possible to perform a color scan operation. In addition, it is possible to perform a color scan operation by combining light reflected from each pixel of the LCD module at the rear of the display module 151. In this case, the amount of red, green or blue light reflected from each pixel of the LCD module may be calculated using tables shown in FIG. 8, and red, green and blue light may be combined based on the results of the calculation. However, the present invention is not restricted to this. That is, various matrices or functions, other than the tables shown in FIG. 8, may be used to combine red, green and blue light.

Since the display module 151 can calculate coordinates based on a variation in the amount of light by using a photo sensor, the display module 151 not only can perform a scan operation but also can serve as an input device capable of receiving various types of touch inputs such as a single- or a multi-touch input.

As described above, the display module 151 may be able not only to perform a scan operation but also to receive various types of touch inputs by using a scan structure of a photo sensor without a requirement of a touch sensor. When no touch sensor is used in the display module 151, the manufacturing cost of the display module 151 can be reduced. On the other hand, when a touch sensor is used in the display module 151, the recognition of a touch input can be stabilized. The display module 151 has been described above as identifying a fingerprint using a photo sensor, but the present invention is not restricted to this. That is, the display module 151 may identify a fingerprint using various methods other than using a photo sensor.

Figure 9:
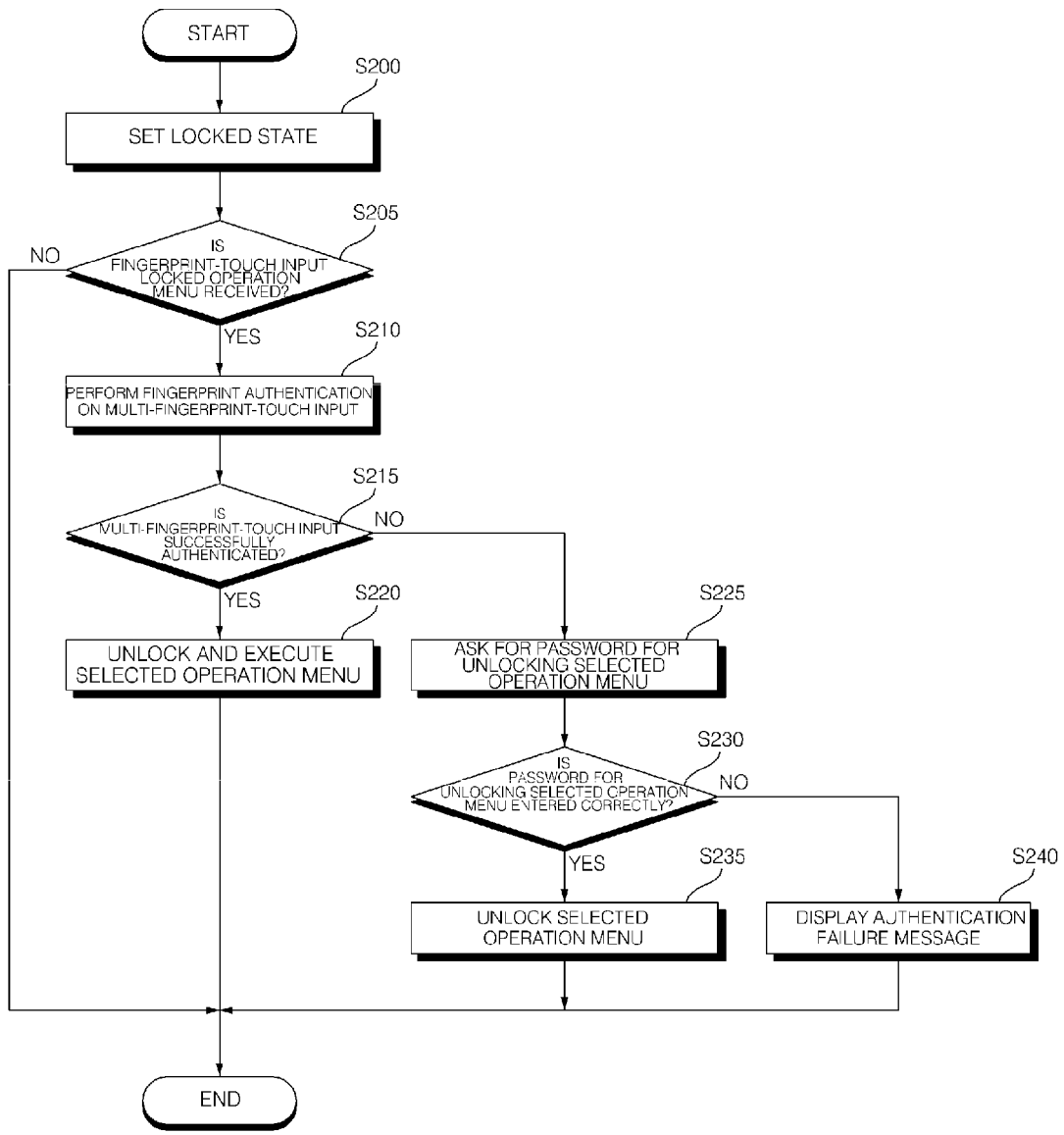
FIG. 9 illustrates a flowchart of a method of controlling a mobile terminal according to a first exemplary embodiment of the present invention.

FIG. 9 illustrates a flowchart of a method of controlling a mobile terminal according to a first exemplary embodiment of the present invention. Referring to FIG. 9, the controller 180 may place the mobile terminal 100 in a locked state, in which the mobile terminal 100 does not respond to any touch or key input, in response to, for example, a user command (S200). More specifically, the controller 180 may lock a whole operation menu or may selectively lock a menu item of an operation menu.

Thereafter, the controller 180 may determine whether a multi-fingerprint-touch input for selecting an operation menu unlocked in operation S200 has been received (S205). A fingerprint-touch input is a touch input generated by touching the surface of the display module 151 with a finger, and a multi-fingerprint-touch input is a multi-touch input generated by touching the surface of the display module 151 with two or more fingers. A multi-fingerprint-touch input may be detected by scanning a plurality of fingerprints at the same time or may be detected based on multi-touch recognition coordinates.

If it is determined in operation S205 that a multi-fingerprint-touch-input for selecting the predetermined operation menu has been received, the controller 180 may perform fingerprint authentication on a plurality of pieces of fingerprint information of the received multi-fingerprint-touch input (S210).

More specifically, fingerprint authentication may be performed by comparing the plurality of pieces of fingerprint information of the received multi-fingerprint-touch input with a plurality of pieces of fingerprint information present in the memory 160. For this, the plurality of pieces of fingerprint information present in the memory 160 may be classified on a finger-by-finger basis, on a user-by-user basis and/or on a pattern-by-pattern basis. That is, the plurality of pieces of fingerprint information present in the memory 160 may include fingerprints acquired from different fingers of an individual or fingerprints acquired from different individuals. Alternatively, the plurality of pieces of fingerprint information present in the memory 160 may include fingerprints having different patterns in consideration that fingerprints acquired even from the same finger can often appear different due to variations in the degree to which, and the pressure with which the finger is brought into contact with the display module 151.

If there are matches for the plurality of pieces of fingerprint information of the received multi-fingerprint-touch input in the memory 160, it may be determined that the plurality of pieces of fingerprint information of the received multi-fingerprint-touch input are successfully fingerprint-authenticated (S215). Then, the controller 180 may unlock the predetermined operation menu, and may control the predetermined operation menu to be executed (S220). The controller 180 may generate an alarm sound or a haptic effect in order to alert the user to the unlocking of the predetermined operation menu. The controller 180 may also generate an alarm sound or a haptic sound when the plurality of pieces of fingerprint information of the received multi-fingerprint-touch input fail to be fingerprint-authenticated.

Alternatively, the controller 180 may display a menu for allowing the user to choose whether to execute the predetermined operation menu, instead of executing the predetermined operation immediately after the unlocking of the predetermined operation menu, especially when the predetermined operation menu is a fee-charging operation menu.

If the plurality of pieces of fingerprint information of the received multi-fingerprint-touch input fail to be fingerprint-authenticated (S215), the controller 180 may ask for a password for unlocking the predetermined operation menu (S225). If the user enters the password for unlocking the predetermined operation menu correctly (S230), the controller 180 may unlock the predetermined operation menu (S235). On the other hand, if the user fails to enter the password for unlocking the predetermined operation menu correctly (S230), the controller 180 may display a message indicating that the user has failed to be fingerprint-authenticated (S240).

In this manner, it is possible to perform the unlocking of an operation menu and the execution of the operation menu in response to a multi-fingerprint-touch input.

Examples of how to perform fingerprint authentication and the execution of an operation menu at the same time in response to a multi-fingerprint-touch input will hereinafter be described in detail. If the user touches a menu icon representing an operation menu (such as a phonebook menu, a 'call list' menu, a 'message' menu, a 'schedule' menu, a 'memo' menu, a 'photo memo' menu, a 'D-day' menu, a 'camera album' menu, a 'content explorer' menu, a 'voice memo' menu, a 'file viewer' menu, a 'text viewer' menu, or a 'video call album' menu) and an execution icon for executing the operation menu at the same time with two fingers and is successfully fingerprint-authenticated when the operation menu is locked, the operation menu may be readily executed without the need to enter a password for unlocking the operation menu. In addition, if the user touches an icon representing a content item (such as a photo, a moving image, an audio file, an MP3 file or a document) and an execution icon at the same time with two fingers and is successfully fingerprint-authenticated when a content-search function is locked, the content item may be readily played or displayed without the need to enter a password for unlocking the content-search function. Moreover, if the user touches an icon representing a menu item, a function, data, or a content item with two fingers and is successfully fingerprint-authenticated when the menu item, the function, the data, or the content item represented by the icon is locked, the menu item, the function, the data, or the content item represented by the icon may be automatically unlocked, and an operation corresponding to the menu item, the function, the data, or the content item represented by the icon may be performed. Furthermore, if the user touches an icon representing a menu item or a function with a finger and then moves or takes a function-executing action on the icon, an operation corresponding to the icon may be readily performed.

Figure 10:
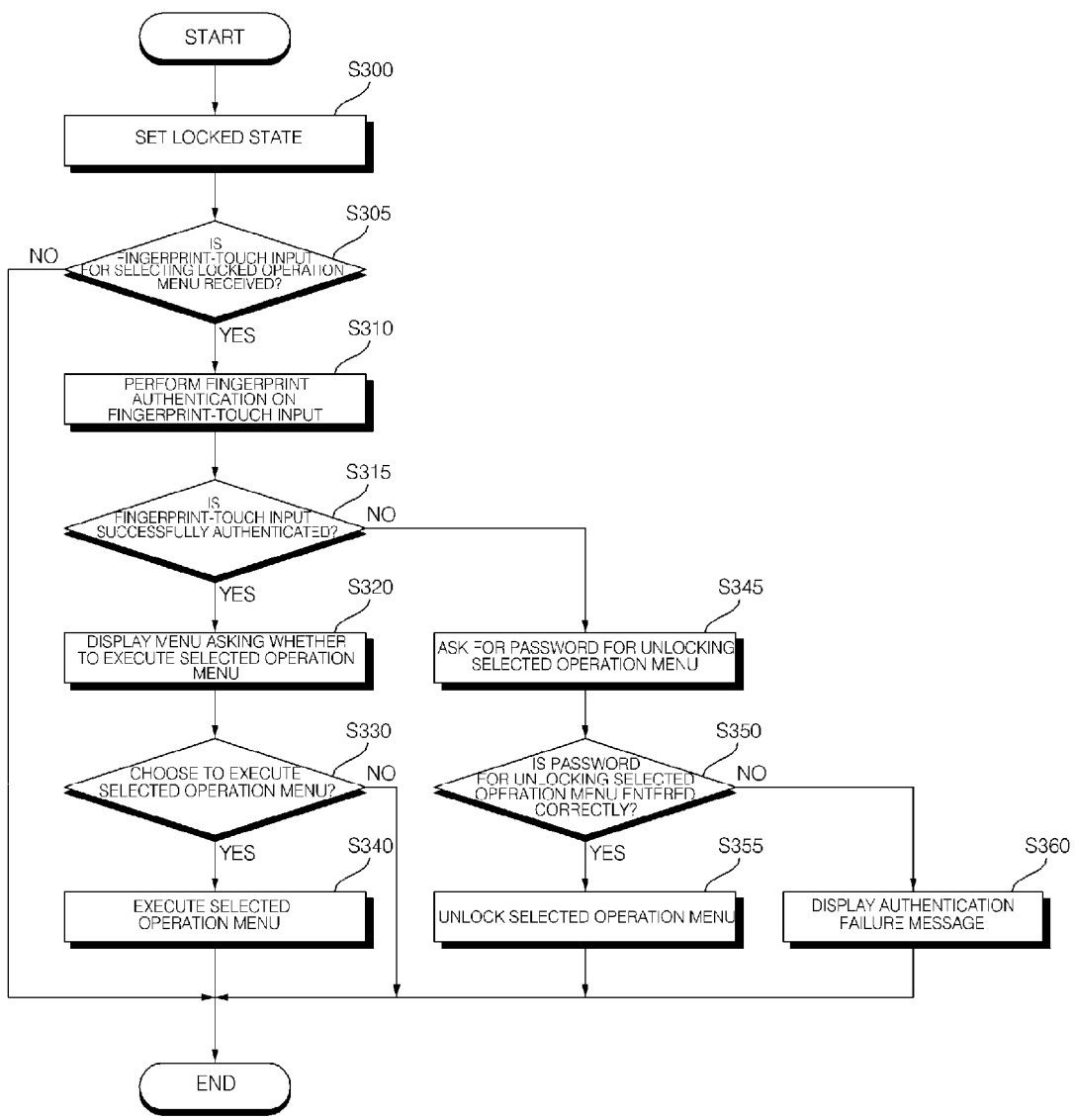
FIG. 10 illustrates a flowchart of a method of controlling a mobile terminal according to a second exemplary embodiment of the present invention.

FIG. 10 illustrates a flowchart of a method of controlling a mobile terminal according to a second exemplary embodiment of the present invention. Referring to FIG. 10, the controller 180 may place the mobile terminal 100 in a locked state, in which the mobile terminal 100 does not respond to any touch or key input, in response to, for example, a user command (S300). More specifically, the controller 180 may lock a whole operation menu or may selectively lock a menu item of an operation menu.

Thereafter, the controller 180 may determine whether a fingerprint-touch input for selecting an operation menu unlocked in operation S300 has been received (S305). If it is determined in operation S305 that a fingerprint-touch input for selecting the predetermined operation menu has been received, the controller 180 may perform fingerprint authentication on fingerprint information of the received fingerprint-touch input (S310).

Thereafter, fingerprint authentication may be performed by comparing the fingerprint information of the received fingerprint-touch input with a plurality of pieces of fingerprint information present in the memory 160. For this, the plurality of pieces of fingerprint information present in the memory 160 may be classified on a finger-by-finger basis, on a user-by-user basis and/or on a pattern-by-pattern basis.

If there is a match for the fingerprint information of the received fingerprint-touch input in the memory 160, it may be determined that the fingerprint information of the received fingerprint-touch input is successfully authenticated (S315). Then, the controller 180 may unlock the predetermined operation menu, and may display a menu for allowing the user to choose whether to execute the predetermined operation menu (S320). The controller 180 may generate an alarm sound or a haptic effect in order to alert the user to the fact that the predetermined operation menu has been unlocked, or that the user has failed to be fingerprint-authenticated. The menu for allowing the user to choose whether to execute the predetermined operation menu may be displayed in case that the predetermined operation menu is a fee-charging operation menu. Thus, it is possible to prevent the user from accidentally executing the predetermined operation menu without knowing that the predetermined operation menu is a fee-charging operation menu. For example, if the user touches a 'call' button on an idle screen for a long time with a finger when outgoing call restriction is set, information regarding the last caller or callee and a popup window for allowing the user to decide whether to make a call to the last caller or callee may both be displayed at the same time. In addition, if the user touches an 'Internet' button on an idle screen with a finger when Internet access restriction is set, a popup window for allowing the user to decide whether to access the Internet may be displayed.

If the user chooses to execute the predetermined operation menu (S330), the controller 180 may execute the predetermined operation menu (S340). Alternatively, the controller 180 may readily execute the predetermined operation menu without displaying a menu for allowing the user to choose whether to execute the predetermined operation menu.

If the user fails to be fingerprint-authenticated (S315), the controller 180 may ask for a password for unlocking the predetermined operation menu (S345). If the user enters the password for unlocking the predetermined operation menu correctly and is thus successfully authenticated (S350), the controller 180 may unlock the predetermined operation menu (S355). On the other hand, if the user fails to enter the password for unlocking the predetermined operation menu correctly, the controller 180 may display a message indicating that the user has failed to be authenticated (S36).

In this manner, it is possible to perform both the unlocking of an operation menu and the execution of the operation menu at the same time in response to a single fingerprint-touch input.

Examples of how to perform fingerprint authentication and the execution of an operation menu at the same time in response to a single fingerprint-touch input will hereinafter be described in detail. If the user touches an operation menu (such as a phonebook menu, a 'call list' menu, a 'message' menu, a 'schedule' menu, a 'memo' menu, a 'photo memo' menu, a 'D-day' menu, a 'camera album' menu, a 'content explorer' menu, a 'voice memo' menu, a 'file viewer' menu, a 'text viewer' menu, or a 'video call album' menu) with a finger when the operation menu is locked using, for example, a phone-lock function, or by the user, the operation menu may be readily executed without the need to enter a password for unlocking the operation menu. In addition, even when an operation menu is unlocked, a menu item of the operation menu may be readily executed in response to a fingerprint-touch input without the need to enter a password for unlocking the operation menu. For example, if the user inputs a phone number '060-1234-5678' and then touches a 'send' button with a finger when toll restriction is set, a call may be readily made to the input phone number without the need to enter a password for canceling toll restriction. Moreover, the user can log on to a website simply by generating a fingerprint-touch input without the need to enter an identifier (ID) and a password.

Figure 11:
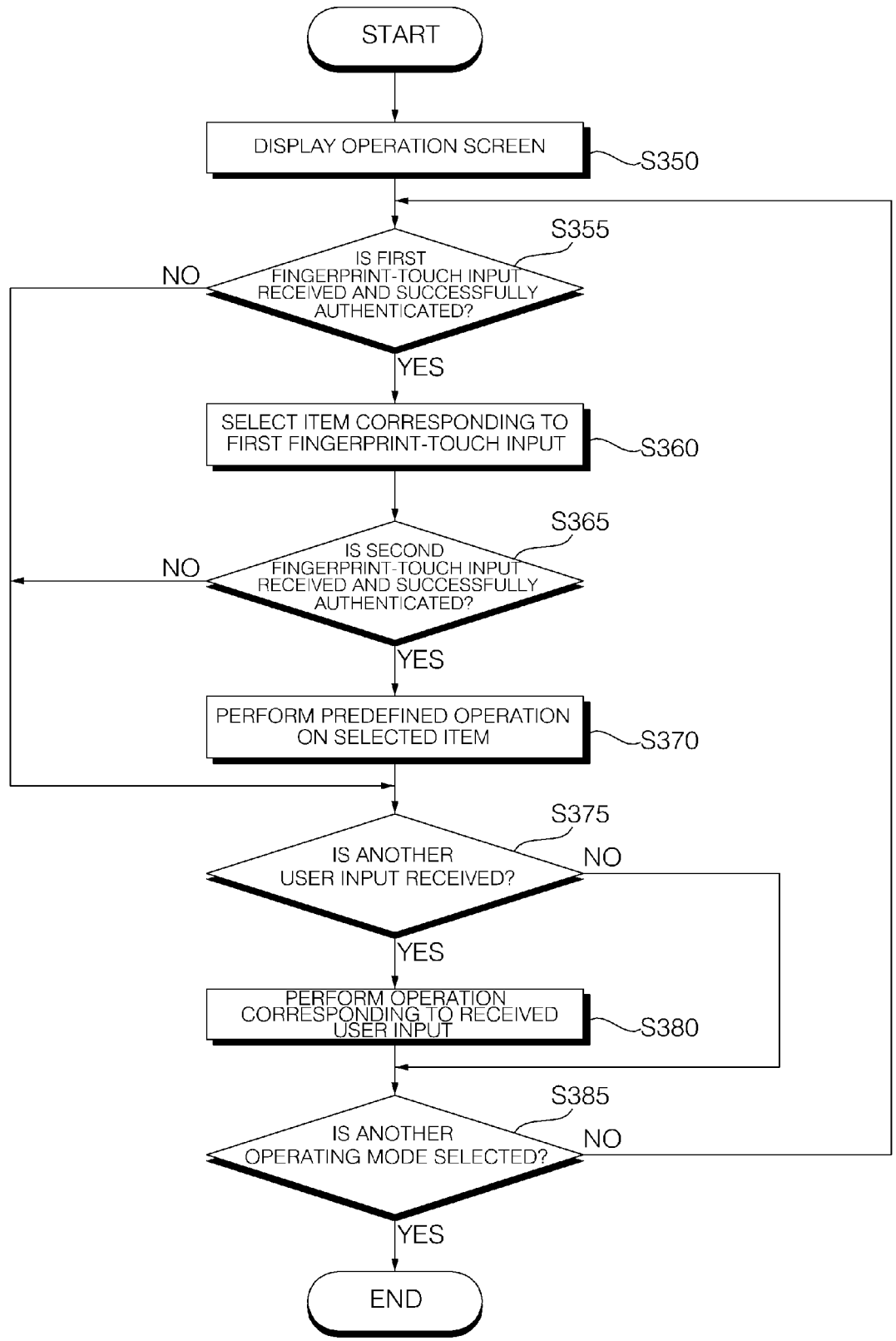
FIG. 11 illustrates a flowchart of a method of controlling a mobile terminal according to a third exemplary embodiment of the present invention.

FIG. 11 illustrates a flowchart of a method of controlling a mobile terminal according to a third exemplary embodiment of the present invention. Referring to FIG. 11, the controller 180 may display an operation screen corresponding to an operation menu currently being executed or an operation currently being performed on the display module 151 (S350). Examples of the operation screen include an idle screen, a message reception screen, a main menu screen, a still or moving image viewer screen, a broadcast screen, a map screen and a webpage screen.

Thereafter, if a first fingerprint-touch input is received and fingerprint information of the first fingerprint-touch input is authenticated (S355), the controller 180 may control an item corresponding to the first fingerprint-touch input to be selected from the operation screen (S360). Examples of the selected item include an image, a menu icon, a list item, an input window, an output window, and the whole operation screen. The selected item may be displayed differently from other non-selected items displayed on the operation screen and may thus be able to be easily recognized. The controller 180 may generate a haptic effect corresponding to the selected item.

Thereafter, if a second fingerprint-touch input is received and fingerprint information of the second fingerprint-touch input is authenticated (S365), the controller 180 may control a predefined operation to be performed on the selected item (S370). Examples of the predefined operation include scaling up or down the selected item, rotating the selected item, moving or scrolling around the operation screen with the selected item fixed, displaying information regarding an operating mode associated with the selected item, or a widget phone list or a candidate list associated with the selected item, changing the direction of the display of the operation screen and switching the mobile terminal 100 to one of a number of operating modes offered by the current operation menu.

Even when the first fingerprint-touch input is not sensed any longer, the predefined operation may continue to be performed on the selected item in response to the second fingerprint-touch input. If the second fingerprint-touch input is not sensed any longer, the selected item may return to its original non-selected state.

If such a user input as an ordinary touch input or a key input is received (S375), the controller 180 may control an operation corresponding to the received user input to be performed (S380). On the other hand, if there is no such user input as an ordinary touch input or a key input received (S375), the method may directly proceed to operation S385.

Operations S355 through S380 may be repeatedly performed until another operating mode is selected (S385). In this manner, it is possible to selectively control an operation performed on an item selected in response to a multi-fingerprint-touch input.

Various operations performed by the mobile terminal 100 may be controlled in various manners, other than those set forth herein, in response to a multi-fingerprint-touch input. For example, the user may generate a multi-fingerprint-touch input by touching an item such as an image, a character-input window or an operation screen with two fingers. Then, if the user spreads the two fingers apart, the selected item may be enlarged. On the other hand, if the user pinches the two fingers together, the selected item may be reduced. If the user drags the two fingers on the display module 151 and thus varies the point of detection of the multi-fingerprint-touch input, the selected item may be moved accordingly. Alternatively, if the selected item is an operation screen and the user drags the two fingers on the display module 151 and thus varies the point of detection of the multi-fingerprint-touch input, the arrangement of the operation screen may vary.

If a multi-fingerprint-touch input is detected along a first direction (such as a vertical direction) when an operation screen corresponding to an operating mode selected by the user is displayed on the display module 151, a first operation corresponding to the selected operating mode may be performed. On the other hand, if a multi-fingerprint-touch input is detected along a second direction (such as a horizontal direction) when the operation screen corresponding to the selected operating mode selected is displayed on the display module 151, a second operation corresponding to the selected operating mode may be performed. For example, if a multi-fingerprint-touch input is detected along the first direction, a shortcut menu screen may be displayed on the display module 151. On the other hand, if a multi-fingerprint-touch input is detected along the second direction, a main menu screen may be displayed on the display module 151. Alternatively, if a multi-fingerprint-touch input is detected along the first direction when a 'call' key is displayed on an idle screen, a video call function may be executed. On the other hand, if a multi-fingerprint-touch input is detected along the second direction when the 'call' key is displayed on an idle screen, a voice call function may be executed. Still alternatively, if a multi-fingerprint-touch input is detected along the first direction, the controller 180 may allow the user to navigate from one folder to a subfolder of the folder or vice versa. On the other hand, if a multi-fingerprint-touch input is detected along the second direction, the controller 180 may allow the user to navigate from one item to another item in a folder. Still alternatively, the controller 180 may be configured to display different information on the display module 151 according to whether a multi-fingerprint-touch input is detected along the first direction or the second direction. Still alternatively, if a multi-fingerprint-touch input is sensed for more than a predefined amount of time, a shortcut function or a menu associated with a current operating mode may be executed.

Figure 12:
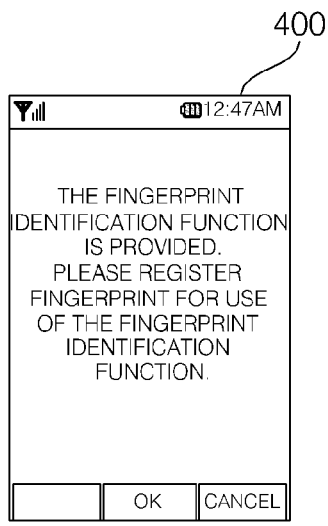
FIGS. 12 through 14 illustrate how to register fingerprint information.
Figure 13:
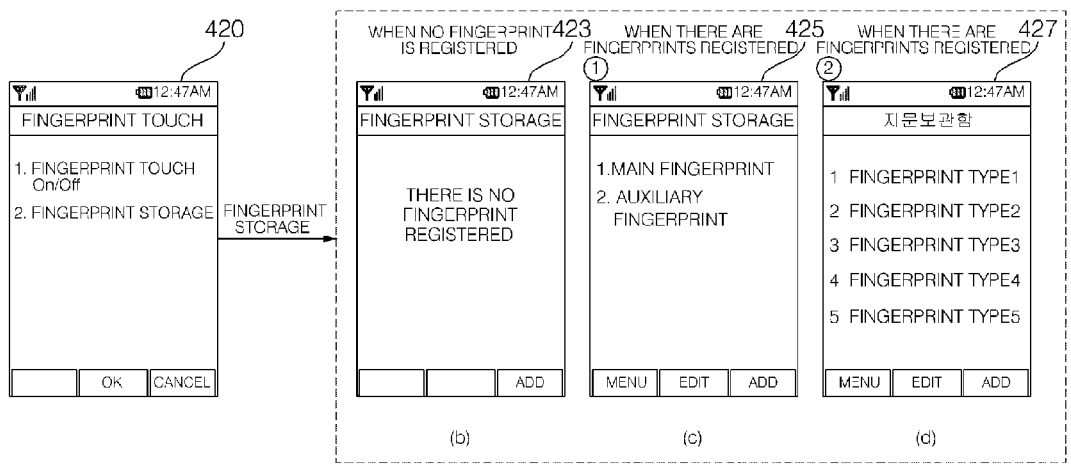
Figure 14:
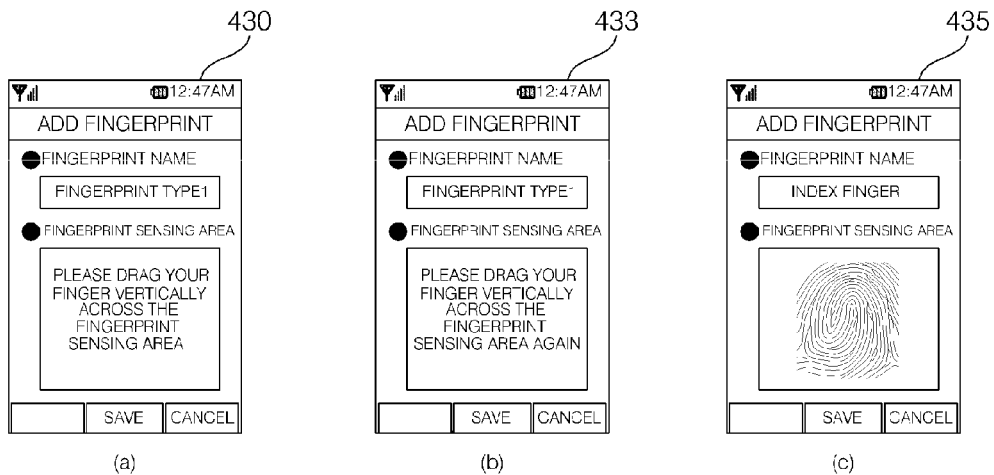
Figure 15:
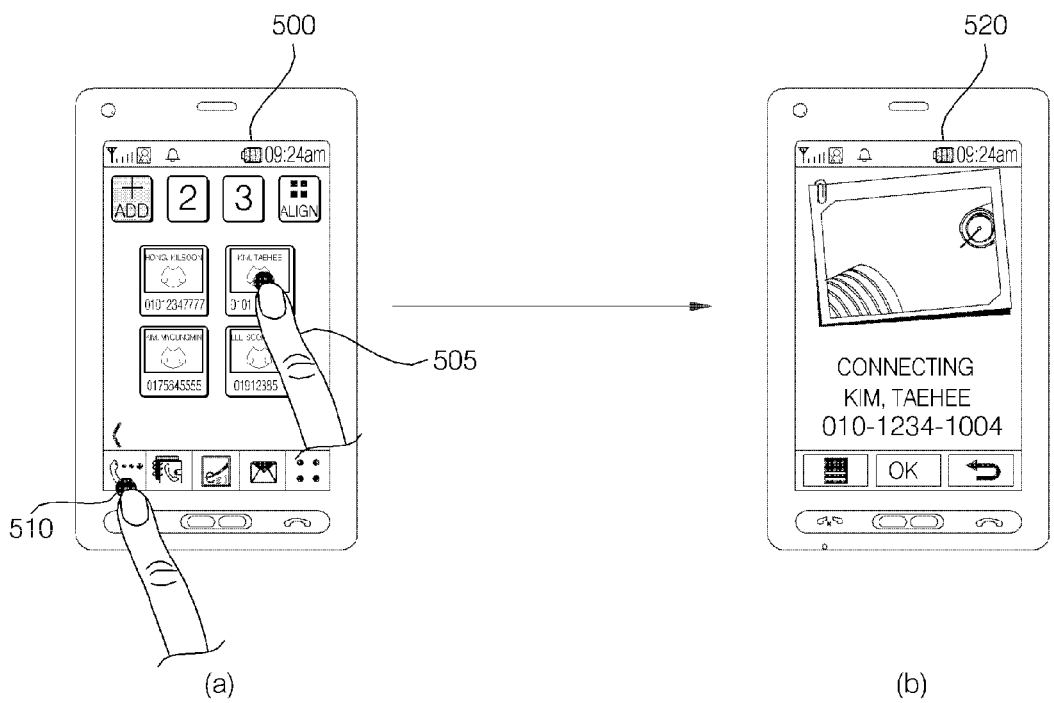
FIGS. 15 through 20 illustrate how to perform an authentication operation and another operation at the same time in response to a multi-fingerprint-touch input.

FIGS. 12 through 14 illustrate how to register fingerprint information in the mobile terminal 100.

Referring to FIG. 12, if no fingerprint is registered in the mobile terminal 100 when the mobile terminal 100 is turned on, a fingerprint registration alert screen 400 recommending that fingerprint information be registered may be displayed on the display module 151. When no fingerprint is registered in the mobile terminal 100, a fingerprint-touch input may be treated as an ordinary touch input.

FIG. 13(*a*) illustrates a fingerprint registration setting screen 420. Referring to FIG. 13(*a*), a 'fingerprint touch on/off' item may be used to turn on or off a fingerprint touch function, and a 'fingerprint storage' item may provide various fingerprint management functions such as the registration, editing, and deletion of fingerprints, and the setting or cancellation of main fingerprints.

Referring to FIG. 13(*b*), if the 'fingerprint storage' item is selected when no fingerprint is registered in the mobile terminal 100, a screen 423 indicating that there is no fingerprint registered in the mobile terminal 100 may be displayed. On the other hand, referring to FIG. 13(*c*) or 13(*d*), if the 'fingerprint storage' item is selected when there are fingerprints registered in the mobile terminal 100, a screen 425 or 427 may be displayed. Alternatively, a screen for registering fingerprints from different fingers may be displayed. Thereafter, if a 'menu' item is selected, a menu including a plurality of menu items such as 'add fingerprint,' 'edit fingerprint,' 'set main fingerprint,' 'delete fingerprint,' and 'delete all fingerprints' may be displayed.

Referring to FIGS. 14(*a*) through 14(*c*), the user may scan a finger vertically onto a fingerprint sensing area on a fingerprint identification screen 430 and may thus allow the mobile terminal 100 to sense a fingerprint of the user. A fingerprint can be registered in the mobile terminal 100 only when the user successfully enters the fingerprint more than a predefined number of times. A fingerprint sensed by the mobile terminal 100 may be saved in the memory 160 with a name for future reference.

The whole surface of the display module 151 may be used as a fingerprint sensing area. Alternatively, for a more efficient fingerprint registration or identification, a certain part of the surface of the display module 151 may be set and used as a valid fingerprint sensing area.

FIGS. 15 through 20 illustrate diagrams for explaining how to perform fingerprint authentication and the execution of an operation at the same time in response to a multi-fingerprint-touch input.

Referring to FIGS. 15(a) and 15(b), if a first fingerprint-touch input 505 for selecting a predetermined item and a second fingerprint-touch input 510 for selecting a 'call' icon are received at the same time and are both successfully authenticated when outgoing call restriction is set, a voice or video call may be automatically made to a person represented by the predetermined item without the requirement of entering a password.

Figure 16:
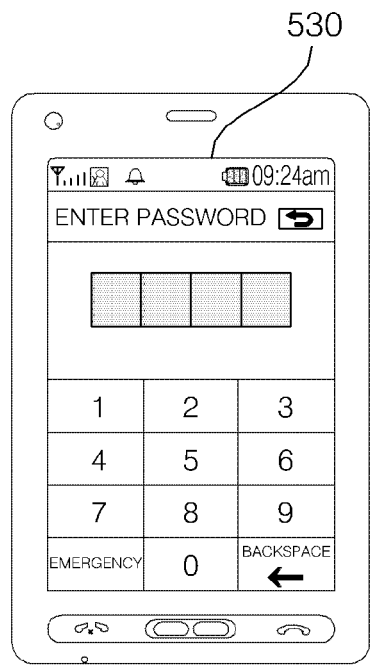

Referring to FIG. 16, if the user fails to be fingerprint-authenticated more than a predefined number of times, a screen 530 asking for a password may be displayed.

Figure 17:
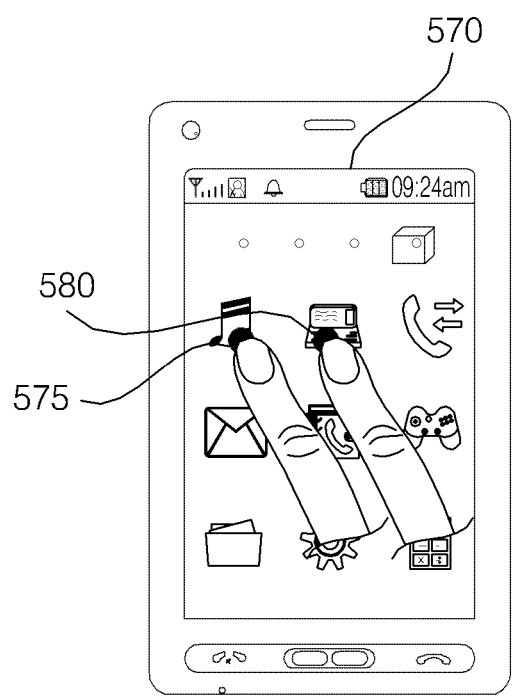

Referring to FIG. 17, if a first fingerprint-touch input 575 for selecting an MP3 menu icon and a second fingerprint-touch input 580 for selecting an electronic dictionary menu icon are received at the same time and are both successfully authenticated when an electronic dictionary menu is locked, an MP3 menu and the electronic dictionary menu may both be executed at the same time.

Figure 18:
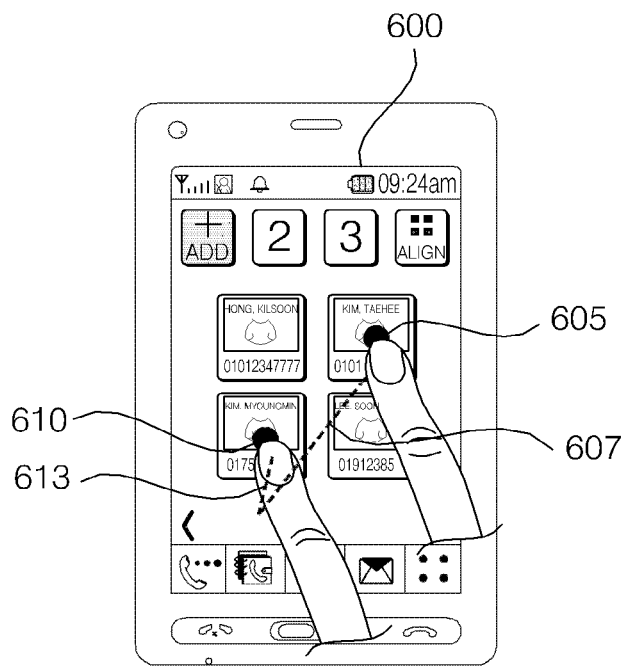

Referring to FIG. 18, if the user generates a multi-fingerprint-touch input by touching two icons with two fingers, as indicated by reference numerals 605 and 610, and then drags the two fingers toward an execution icon, as indicated by reference numerals 607 and 610, and the multi-fingerprint-touch input is successfully authenticated, an operation corresponding to the execution icon, for example, making a conference call or sending a message, may be performed on two persons respectively represented by the two icons.

Figure 19:
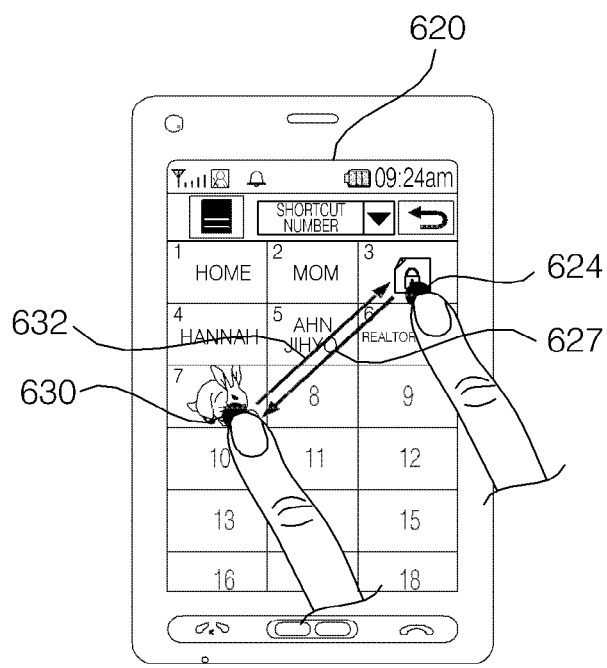

Referring to FIG. 19, if the user generates a multi-fingerprint-touch input by touching two shortcut number indexes with two fingers, as indicated by reference numerals 624 and 630, and then takes a function-executing action on the two shortcut number indexes, as indicated by reference numerals 627 and 632, and the multi-fingerprint-touch input is successfully authenticated, the two shortcut number indexes may be adjusted, or a predefined operation may be performed without the requirement of entering a password.

Figure 20:
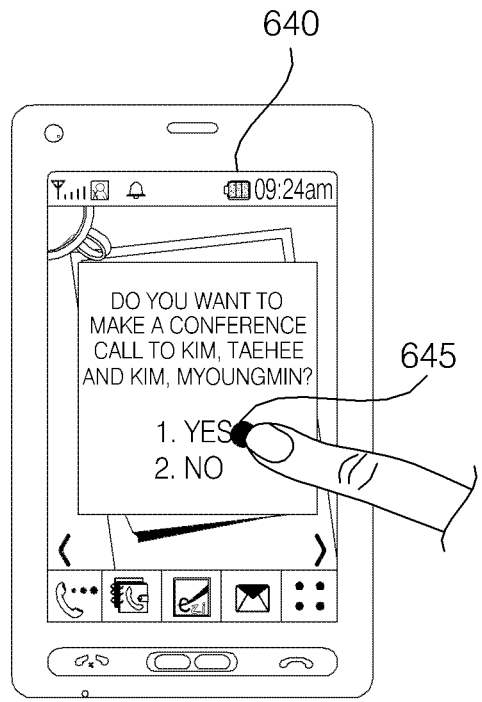
Figure 21:
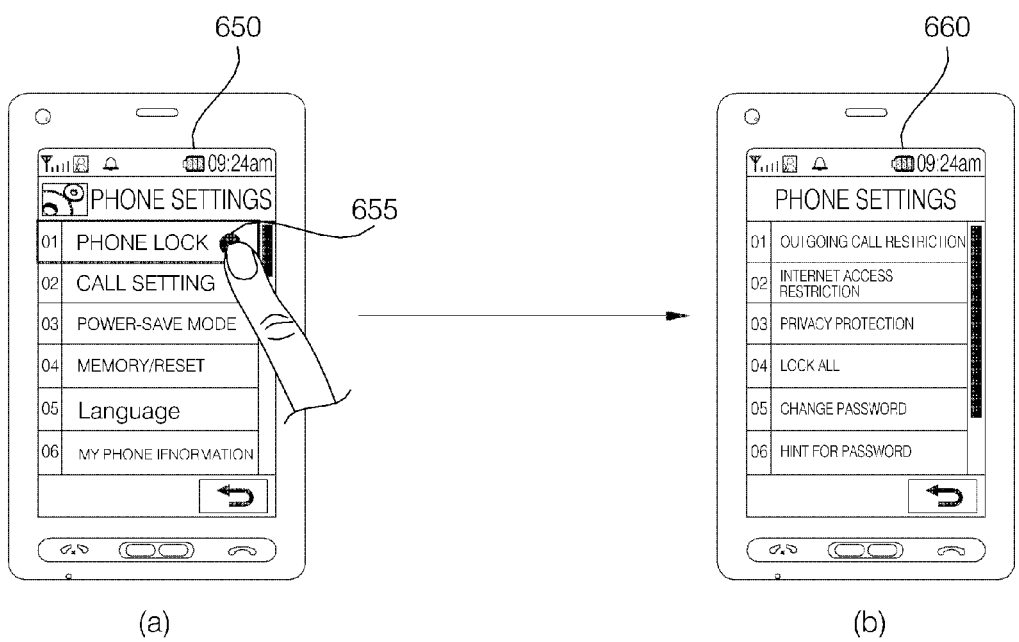
FIGS. 21 through 24 illustrate how to perform an authentication operation and another operation at the same time in response to a single fingerprint-touch input.
Figure 22:
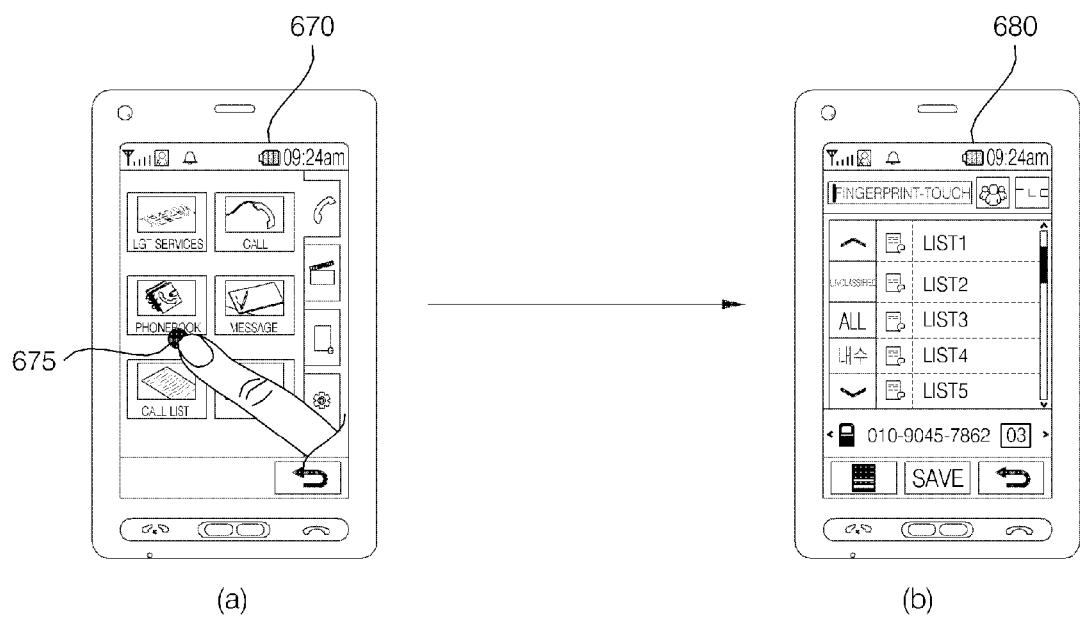
Figure 23:
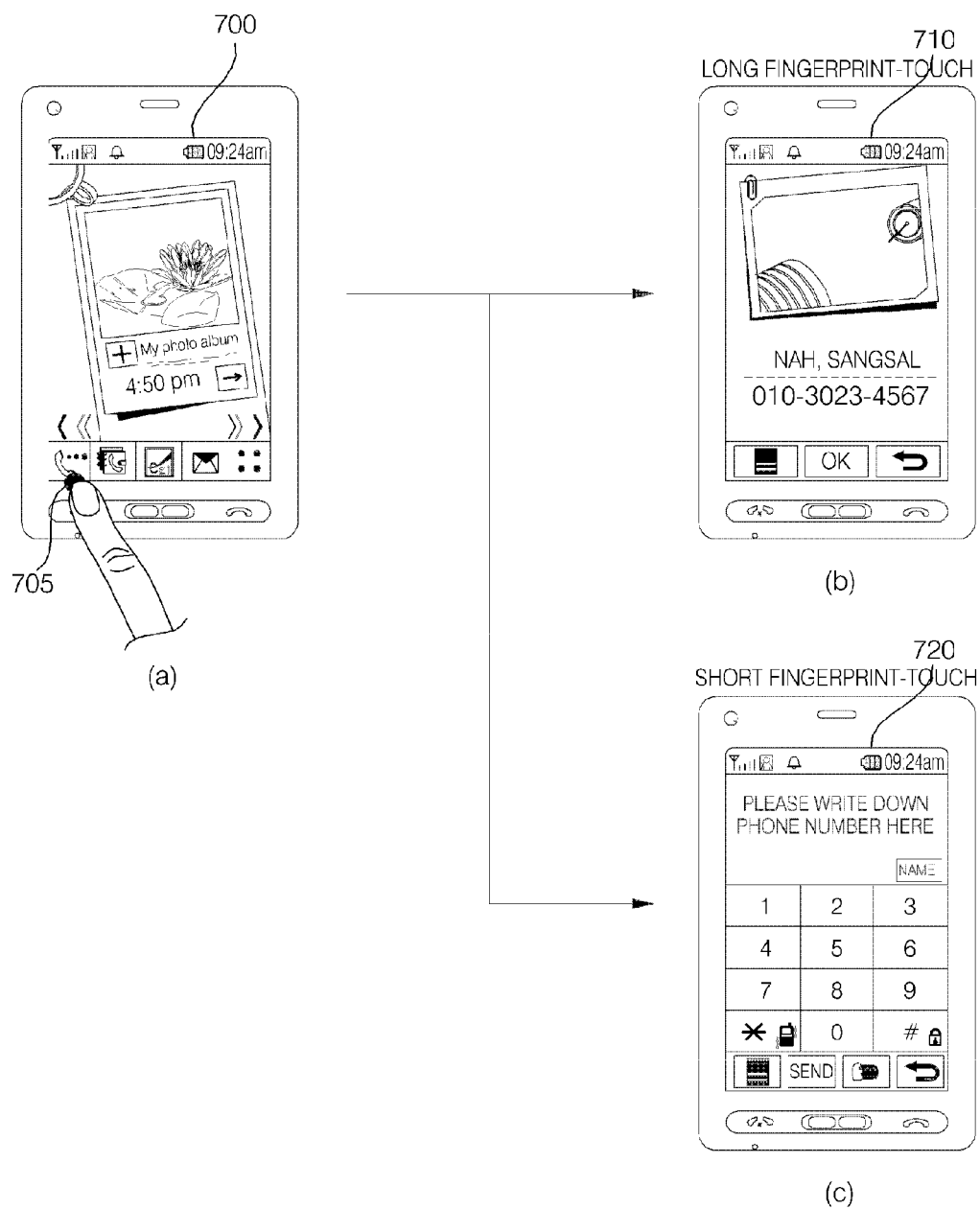
Figure 24:
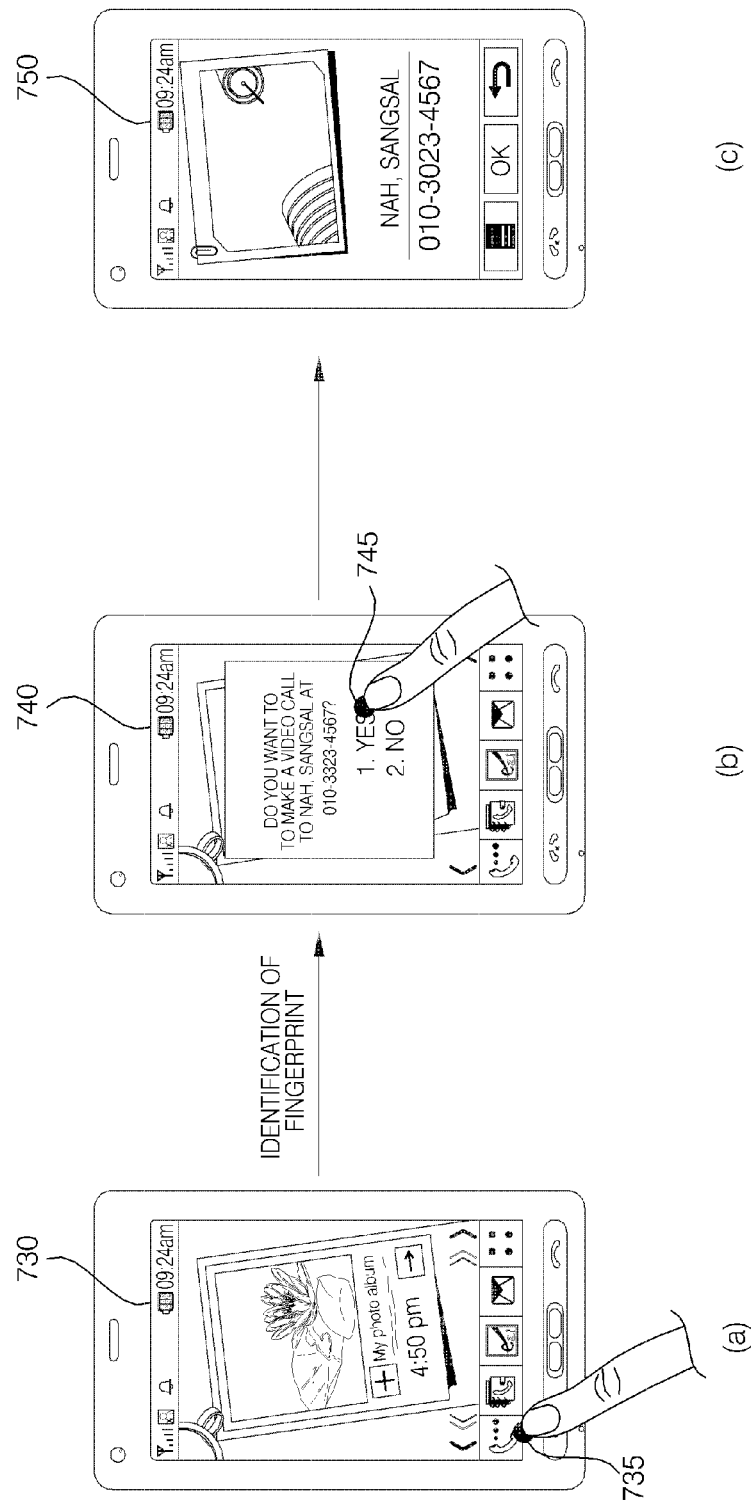

Referring to FIG. 20, even if a multi-fingerprint-touch input for selecting an item is successfully authenticated, an operation corresponding to the item may not be readily performed. Instead, a screen 640 asking whether to perform the operation corresponding to the item may be displayed. If the user chooses a 'Yes' item from the screen 640, the operation corresponding to the item may be performed.

FIGS. 21 through 25 illustrate diagrams for explaining how to perform fingerprint authentication and the execution of an operation at the same time in response to a single fingerprint-touch input.

Referring to FIGS. 21(a) and 21(b), if a fingerprint-touch input 655 for selecting a 'Phone Lock' item from a 'Phone Settings' screen 650 is received and is successfully authenticated, the 'Phone Lock' item may be unlocked, and thus, a 'Phone Lock' screen 660 may be displayed.

Referring to FIGS. 22(a) and 22(b), if a fingerprint-touch input 675 for selecting a 'Phonebook' icon from a main menu screen 670 is received and is successfully authenticated, a phonebook menu may be unlocked, and thus, a phonebook screen 680 may be displayed.

Referring to FIGS. 23(a) through 23(c), the controller 180 may perform different operations according to whether the user touches a call menu icon displayed on an idle screen 700 for a long time or for a short time with a finger. More specifically, referring to FIGS. 23(a) and 23(b), if the user generates a fingerprint-touch input 705 by touching the call menu icon for a long time, a call may be automatically made to a predetermined person. On the other hand, FIGS. 23(a) and 23(c), if the user generates a fingerprint-touch input 705 by touching the call menu icon only for a short time, a 'Phone Number Input' screen 720 allowing the user to input a phone number may be displayed.

Referring to FIG. 24(a), if a fingerprint-touch input 735 for selecting a call menu icon displayed on an idle screen 730 is received, a screen 740 asking whether to connect a video call may be displayed. If the user chooses to connect a video call from the screen 740, a screen 750 for connecting a video call may be displayed, as shown in FIG. 24(c).

Figure 25:
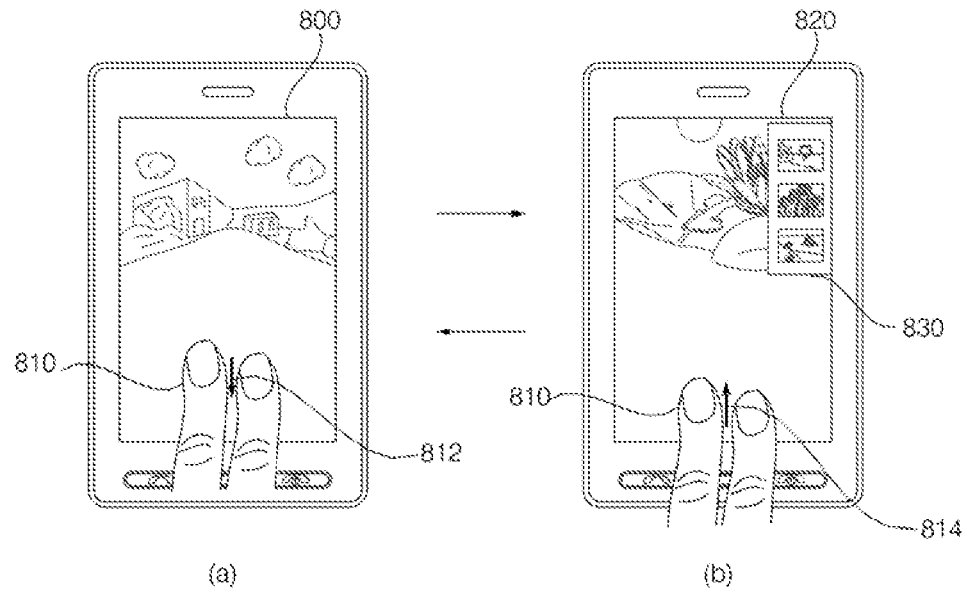
FIGS. 25 and 26 illustrate how to control an operation performed on an item selected in response to a multi-fingerprint-touch input.
Figure 26:
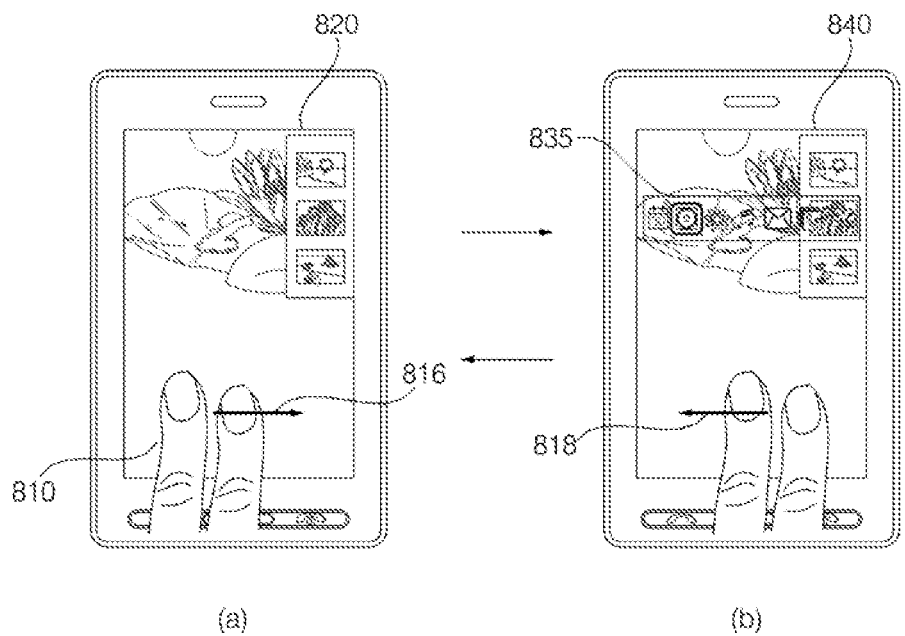

FIGS. 25 and 26 illustrate diagrams for explaining how to control an operation performed on an item selected in response to a multi-fingerprint-touch input.

Referring to FIGS. 25(a) and 25(b), if, when an idle screen 800 is displayed on the display module 151, a multi-fingerprint-touch input 810 is received and then a point of detection of the multi-fingerprint-touch input 810 changes, as indicated by reference numeral 812, a screen 820 including a main menu bar 830 may be displayed on the display module 151. Thereafter, if the point of detection of the multi-fingerprint-touch input 810 changes, as indicated by reference numeral 814, the idle screen 800 may be displayed back on the display module 151.

Referring to FIGS. 26(a) and 26(b), if the point of detection of the multi-fingerprint-touch input 810 moves to the right, as indicated by reference numeral 816, a sub-menu bar 835 may be displayed. On the other hand, referring to FIG. 26(b), if the point of detection of the multi-fingerprint-touch input 810 moves to the left, as indicated by reference numeral 818, the screen 820 may be displayed back on the display module 151. Each menu item in the main menu bar 830 or the sub-menu bar 835 may be executed in response to an ordinary touch input or in response to a multi-fingerprint-touch input sensed for more than a predefined amount of time.

The mobile terminal according to the present invention and the method of controlling the mobile terminal according to the present invention are not restricted to the exemplary embodiments set forth herein. Therefore, variations and combinations of the exemplary embodiments set forth herein may fall within the scope of the present invention.

The present invention can be realized as code that can be read by a processor (such as a mobile station modem (MSM)) included in a mobile terminal and that can be written on a computer-readable recording medium. The computer-readable recording medium may be any type of recording device in which data is stored in a computer-readable manner. Examples of the computer-readable recording medium include a ROM, a RAM, a CD-ROM, a magnetic tape, a floppy disc, an optical data storage, and a carrier wave (e.g., data transmission through the Internet). The computer-readable recording medium can be distributed over a plurality of computer systems connected to a network so that computer-readable code is written thereto and executed therefrom in a decentralized manner. Functional programs, code, and code segments needed for realizing the present invention can be easily construed by one of ordinary skill in the art.

As described above, according to the present invention, it is possible to control various operations performed by a mobile terminal in response to a multi-fingerprint-touch input. In addition, it is possible to perform fingerprint authentication and the execution of an operation at the same time in response to a fingerprint-touch input. Moreover, it is possible to use a fingerprint-touch input along with a key input and/or an ordinary touch input and thus to improve the convenience of manipulation of a mobile terminal.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of controlling a mobile terminal, the method comprising:
    displaying an operation screen on a display module configured to identify a fingerprint;
    selecting a locked operation menu corresponding to a multi-fingerprint-touch input from the operation screen when the multi-fingerprint-touch input is received via the display module, wherein the multi-fingerprint-touch input includes a first fingerprint-touch input for selecting a first icon from the operation screen and a second fingerprint-touch input for selecting a second icon from the operation screen, the first and second fingerprint-touch inputs received at the same time;
    unlocking and executing the selected locked operation menu when fingerprint information related to the multi-fingerprint-touch input is authenticated; and
    outputting a haptic effect indicating whether the fingerprint information is authenticated,
    wherein executing the selected locked operation menu comprises:
    performing an operation corresponding to the second icon with regard to the first icon when the first icon is an item icon and the second icon is a function icon, and
    performing a first operation corresponding to the first icon and a second operation corresponding to the second icon at the same time when the first icon is a first menu icon and the second icon is a second menu icon.

2. The method of claim 1, further comprising requesting a password for unlocking the selected locked operation menu when the fingerprint information is not authenticated.

3. The method of claim 1, further comprising displaying a menu asking whether to execute the selected locked operation menu when the fingerprint information is authenticated.

4. The method of claim 1, further comprising outputting an alarm signal indicating whether the fingerprint information is authenticated.

5. The method of claim 1, further comprising storing a plurality of pieces of fingerprint information for use in authenticating the fingerprint information.

6. The method of claim 1, further comprising:
    selecting an item corresponding to the received first fingerprint-touch input from the operation screen when first fingerprint information related to the first fingerprint-touch input is authenticated; and
    performing a predefined operation on the selected item when second fingerprint information related to the second fingerprint-touch input is authenticated.

7. The method of claim 6, further comprising displaying the selected item such that the selected item may be easily distinguished from non-selected items displayed on the operation screen.

8. The method of claim 6, further comprising generating a haptic effect corresponding to the selected item.

9. The method of claim 1, further comprising:
    receiving another multi-fingerprint-touch input via the display module while an operation screen corresponding to a selected operation mode is displayed;
    detecting a direction of the received another multi-fingerprint-touch input; and
    performing an operation corresponding to the detected direction with regard to the selected operation mode.

10. A mobile terminal comprising:
    a display module configured to identify a fingerprint and display an operation screen; and
    a controller configured to:
        receive a multi-fingerprint-touch input via the display module;
        select a locked operation menu corresponding to the multi-fingerprint-touch input from the operation screen when the multi-fingerprint-touch input is received;
        unlock and execute the selected locked operation menu when fingerprint information related to the multi-fingerprint-touch input is authenticated;
        output a haptic effect indicating whether the fingerprint information is authenticated,
    wherein the multi-fingerprint-touch input includes a first fingerprint-touch input for selecting a first icon from the operation screen and a second fingerprint-touch input for selecting a second icon from the operation screen, the first and second fingerprint-touch inputs received at the same time,
    wherein the controller is further configured to:
    perform an operation corresponding to the second icon with regard to the first icon when the first icon is an item icon and the second icon is a function icon; and
    perform a first operation corresponding to the first icon and a second operation corresponding to the second icon at the same time when the first icon is a first menu icon and the second icon is a second menu icon.

11. The mobile terminal of claim 10, wherein the controller is further configured to control the display module to display a menu for requesting a password to unlock the selected locked operation menu when the fingerprint information is not authenticated.

12. The mobile terminal of claim 10, further comprising a memory configured to store a plurality of pieces of fingerprint information for use in the authentication of the fingerprint information.

13. The mobile terminal of claim 10, wherein
    the controller is further configured to:
    select an item corresponding to the received first fingerprint touch input from the operation screen when first fingerprint information related to the first fingerprint-touch input is authenticated; and
    perform a predefined operation on the selected item when second fingerprint information related to the second fingerprint-touch input is authenticated.

14. The mobile terminal of claim 13, further comprising a memory configured to store a plurality of pieces of fingerprint information for use in authenticating the first fingerprint information and the second fingerprint information.

15. The mobile terminal of claim 10, wherein the controller is further configured to:
    receive another multi-fingerprint-touch input via the display module while an operation screen corresponding to a selected operation mode is displayed;

detect a direction of the received another multi-fingerprint-touch input; and perform an operation corresponding to the detected direction with regard to the selected operation mode.

* * * * *